US012012108B1

(12) United States Patent
Pronovost

(10) Patent No.: US 12,012,108 B1
(45) Date of Patent: Jun. 18, 2024

(54) PREDICTION MODELS IN AUTONOMOUS VEHICLES USING MODIFIED MAP DATA

(71) Applicant: Zoox, Inc., Foster City, CA (US)

(72) Inventor: Ethan Miller Pronovost, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 254 days.

(21) Appl. No.: 17/710,530

(22) Filed: Mar. 31, 2022

(51) Int. Cl.
B60W 40/04 (2006.01)
B60W 50/00 (2006.01)
B60W 60/00 (2020.01)
G01C 21/00 (2006.01)

(52) U.S. Cl.
CPC ........ B60W 40/04 (2013.01); B60W 50/0097 (2013.01); B60W 60/001 (2020.02); G01C 21/3859 (2020.08); B60W 2420/403 (2013.01); B60W 2554/4029 (2020.02); B60W 2554/404 (2020.02)

(58) Field of Classification Search
CPC ............. B60W 40/04; B60W 50/0097; B60W 60/001; B60W 2420/403; B60W 2554/4029; B60W 2554/404; G01C 21/3859
See application file for complete search history.

(56) References Cited

U.S. PATENT DOCUMENTS

| 9,612,123 | B1 * | 4/2017 | Levinson | G05D 1/6987 |
| 9,840,256 | B1 * | 12/2017 | Valois | G01S 17/86 |
| 2017/0270361 | A1 * | 9/2017 | Puttagunta | B60W 30/00 |
| 2018/0218226 | A1 * | 8/2018 | Wellington | G06V 20/56 |
| 2020/0180612 | A1 * | 6/2020 | Finelt | G05D 1/0214 |
| 2021/0276598 | A1 * | 9/2021 | Amirloo Abolfathi | B60W 30/09 |

FOREIGN PATENT DOCUMENTS

| EP | 2687817 A2 * | 1/2014 | ............ G01C 11/00 |
| WO | WO-2009112305 A1 * | 9/2009 | ............ G01C 21/32 |

* cited by examiner

Primary Examiner — Hung Q Nguyen
(74) Attorney, Agent, or Firm — Lee & Hayes, P.C.

(57) ABSTRACT

An autonomous vehicle may modify scene context map data based on specific object types and/or features perceived within an environment, and may use the modified map data with prediction machine learning models to predict the behaviors of other dynamic objects in the environment. In some examples, the vehicle may receive sensor data of the environment, as well as map data representing the static context of the environment. The vehicle may analyze the sensor data to determine combinations of object types, features, and/or events, and may use predefined heuristics to determine modifications to existing map features based on the specific combinations of object data. A multi-channel representation of the environment based on the modified map data may be provided to prediction models to predict the behavior of dynamic objects and control the vehicle.

20 Claims, 10 Drawing Sheets

PREDICTION MODELS IN AUTONOMOUS VEHICLES USING MODIFIED MAP DATA

BACKGROUND

Autonomous vehicles may include various software-based systems, hardware-based systems, and/or controllers to guide the vehicle through an environment. For example, a controller of a vehicle can use sensor systems, object perception and prediction systems, and route planning and optimization techniques to plan routes, determine drive paths, and guide the vehicle through environments containing static and dynamic objects. In order to ensure safety for passengers as well as surrounding persons and objects, while traversing through congested areas with other moving vehicles (autonomous or otherwise), moving people, stationary buildings, etc., the autonomous vehicle may receive and analyze data to make navigation decisions. For instance, while traversing an environment, the autonomous vehicle may use a combination of sensor data from various sensors about the objects in the surrounding environment, as well map data representing the surrounding environment, to analyze the environment and determine how to control and navigate the vehicle in the environment. However, predicting the behaviors of vehicles, pedestrians, and other dynamic objects in an environment may present challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
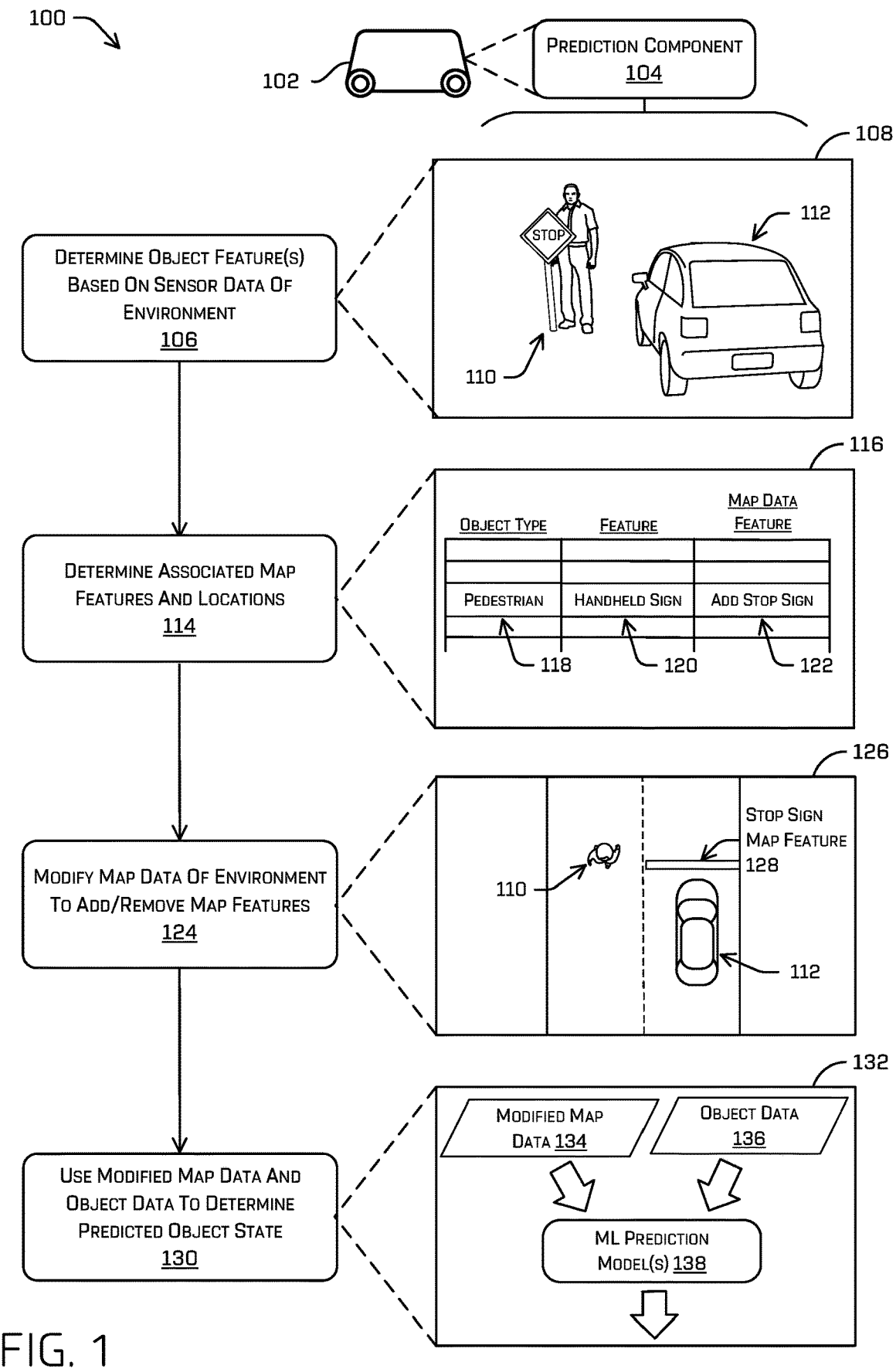
FIG. 1 illustrates an example technique for modifying the map data on a vehicle based on object features determined from sensor data, and using the modified map data in ML prediction models, in accordance with one or more examples of the disclosure.

Techniques described herein relate to using machine learning (ML) prediction models in a vehicle to predict the behaviors of dynamic objects in the environment of the vehicle, and to control the vehicle based on the predicted behaviors of the other dynamic objects. In particular, techniques are described herein for modifying the map data used by the vehicle representing the static scene context of the environment, in response to detecting specific object types, features, and/or events based on sensor data captured by the vehicle. A prediction component of the vehicle may define heuristics associating specific combinations of object data (e.g., objects types and object features) with corresponding modifications to the map data features. When a specific combination of object data is perceived by the vehicle, the prediction component may update the map data defining the static scene context of the environment, by adding, removing, or modifying an associated set of map features. As a simple example, when the vehicle detects a pedestrian wearing a high-visibility vest and holding a traffic sign reading "Stop" or "Yield," the prediction component may determine that the other dynamic objects in the environment are likely to respond to the pedestrian in a similar manner to a fixed stop sign. As a result, the prediction component may modify the map data used by the ML prediction models on the vehicle to add a new stop sign map feature at the location of the pedestrian.

After modifying the map data based on the object data perceived in the environment, the prediction component may use the modified map data and additional object data captured by the vehicle sensors to generate a multi-channel representation of the environment. In various examples, multi-channel representations may include top-down view representations stored as image data, and/or graph-based representations stored as graph neural networks (GNNs). The prediction component may input the multi-channel representation into one or more ML prediction models, and may receive output data from ML models indicating predicted future locations, trajectories, poses, and/or other predicted states for the other dynamic objects in the environment. Based on the predicted object states and the current state and trajectory of the vehicle, the vehicle may determine and execute driving maneuvers to safely and efficiently navigate the environment.

In some examples, the techniques discussed herein may be implemented in the context of a vehicle, such as an autonomous vehicle. When an autonomous vehicle is operating in an environment, the vehicle may receive sensor data (e.g., from other vehicles or from infrastructure) or may use sensors to capture sensor data (e.g., image or video data, radar data, lidar data, sonar data, etc.) of the surrounding environment, and may analyze the sensor data to detect and classify objects within the environment. Objects encountered by the autonomous vehicle may include other dynamic objects that are capable of movement (e.g., vehicles, motorcycles, bicycles, pedestrians, animals, etc.) and/or static objects (e.g., buildings, road surfaces, trees, signs, barriers, parked vehicles, etc.). In order to safely traverse the environment, the autonomous vehicle may include components configured to analyze the attributes of the detected objects and predict trajectories for objects. For example, perception and/or prediction components of an autonomous vehicle may execute trained models or other subcomponents configured to detect and classify objects based on the sensor data (e.g., segmentation, classification, tracking, etc.), and to analyze the movement of the objects to predict future routes and/or trajectories, etc. For instance, perception and/or prediction components may analyze various modalities of sensor data to classify objects into object types (e.g., cars, trucks, motorcycles, pedestrians, cyclists, animals, buildings, trees, etc.), and may determine object features or attributes, and may predict future object behaviors and states (e.g., potential trajectories, locations, poses, etc.) based on the output of the trained prediction models.

To traverse an environment safely and efficiently, it may be important for an autonomous vehicle to make accurate predictions of the future locations and states of the other dynamic objects in the environment. However, predicting the trajectories of dynamic objects in real-world driving environments can be technically challenging and computationally expensive. For example, an autonomous vehicle may predict a future trajectory for an object based on a current or previous trajectory of the object, the existing velocity vector of the object, and/or the map data associated with the environment. However, dynamic objects may change their trajectories frequently and unpredictably, requiring the autonomous vehicle to update the predicted object trajectories and determine corresponding updated driving maneuvers on the fly for the autonomous vehicle to perform.

Autonomous vehicles may use various ML prediction models to make future state predictions (e.g., predicted locations, trajectories, poses, and/or other state data) for the dynamic objects in the environment. In some cases, a prediction component of an autonomous vehicle may execute one or more ML prediction models configured to output predicted state data based on a current representation of the environment. The ML prediction models may be trained using training data, which may include log data previously captured by similar vehicles traversing similar environments. When ML prediction models are trained with sufficiently large amounts of previous vehicle log data, the models may provide highly accurate predictions of the behaviors of dynamic objects for the driving scenarios commonly encountered within the training data. For example, trained ML models may provide robust and accurate predictions of how dynamic objects are likely to behave when encountering common map features such as stop signs, traffic lights, crosswalks, speed bumps, merging lanes, etc. However, relatively less training data (e.g., vehicle log data) may be available for predicting how a dynamic object will behave relative to low-frequency driving scenarios and uncommon objects or features. As a result, ML prediction models may be less accurate predictors of how dynamic objects are likely to react in these low-frequency scenarios or when encountering uncommon objects/features. For instance, the training data for an ML prediction model may include many examples of how dynamic objects behave relative to stop signs, but few examples of how dynamic objects behave relative to construction workers with handheld stop signs at construction zones. Therefore, ML prediction models trained with this training data may provide highly accurate predictions of the behaviors of dynamic objects relative to stop signs, but much less accurate predictions of how the same dynamic objects are likely to behave when encountering construction workers with handheld stop signs.

The techniques described herein address these technical challenges and improve systems using trained ML prediction models to navigate within environments. In particular, the techniques herein may improve the predictive performance of ML models in situations when the vehicle encounters low-frequency objects and/or driving scenarios, while also reducing the amount of training data and computing resources needed to train models to make accurate predictions in such low-frequency situations. In various examples described herein, the vehicle may analyze sensor data to detect specific low-frequency situations (e.g., low-frequency object types, low-frequency features associated with objects, low-frequency driving scenarios, etc.), and may use heuristics to modify the map data based on the low-frequency situations. The modified map data may be used, along with object data perceived using sensors, to generate a multi-channel representation of the environment which can be provided as input to trained ML prediction models. Thus, the techniques described herein may effectively replace instances of low-frequency object data encountered in driving environments (e.g., construction workers holding stop signs) with higher-frequency fixed map features (e.g., stop signs) for which the ML models have been thoroughly trained to provide robust and accurate predictions.

The various examples described herein may apply to any relatively low-frequency object or driving situation detected by the vehicle based on sensor data, that can be mapped to an associated map feature in the static scene context (e.g., map data) used by the vehicle. A simple example of the techniques described herein may include adding a stop sign or traffic light map feature within the map data in response to detecting a pedestrian (e.g., a police officer or construction worker) with a handheld stop sign. As illustrated by this simple example, the type of the map feature added (e.g., a stop sign feature) may be different from the type of the object detected (e.g., a pedestrian). Various other examples of low-frequency objects or driving situations that may be associated with map features can include pedestrians having specific object features (e.g., wearing uniforms or holding identifiable objects), vehicles of certain types of having specific object features (e.g., school buses, construction vehicles, emergency or law enforcement vehicles, etc.), or static objects/road debris having specific detectable object features (e.g., construction equipment, words/labels, lane markers, road flares, etc.). Heuristics data used by the vehicle may define a set of associations between the specific object types/features detected by the vehicle (or various combinations of object types/features) and corresponding map features to be added to the map data. For instance, depending on the analysis of the object data detected by the vehicle, the prediction component may add new map features to the map data defining the static scene context of the environment, including but not limited to stop signs, yield signs, slow signs, speed limit signs, any other traffic signs or signals, crosswalks, new lanes, new lane boundaries, sidewalks, shoulders, etc.

In some instances, the location of a new map feature added to the static map data can be the same as the corresponding physical location in the environment at which the associated object data was detected. For instance, a construction worker with a handheld stop sign can be replaced with a stop sign map feature at the same corresponding location in the map data. However, in other cases, the prediction component may determine different locations for new map features that do not match the corresponding locations of the perceived object or feature in the environment. For instance, an object/feature perceived at one side of a traffic intersection or one side of a construction area may cause the prediction component to infer additional objects/features on the other side of the intersection or construction area. For instance, perceiving a construction flagger holding a slow sign at one entrance to a construction area may cause the prediction component to infer that another construction flagger holding a stop sign is at the other entrance to the construction area. As another example, a traffic officer or crossing guard signaling to one side of an intersection may be inferred as providing an opposite signal to cars on the other side of the intersection. In such cases, the prediction component may determine new map locations and add additional map features even when objects might not be directly perceived at the new map locations.

In addition to, or instead of, adding new map features based on the object data perceived by the vehicle, in some cases the prediction component may remove existing map features from the map data based on the perceived object data. For instance, when detecting a pedestrian with a handheld stop sign marking the beginning of a road construction area, the prediction component may add one or more new map features (e.g., stop signs) into the map data at the boundaries of the construction zone. In this example, the prediction component also may remove one or more existing map features, such as any stop signs, streetlights, or crosswalks within the construction area, because the dynamic objects in the environment are likely to observe the temporary construction signs and markings rather than the preexisting map features in the construction area.

As illustrated by various examples, the techniques described herein can improve the functioning of computing devices in a number of ways. For instance, these techniques may improve the performance of trained ML prediction models, providing more accurate output predictions of the future states of dynamic objects when low-frequency driving scenarios or objects are encountered. By providing improved and quicker predictions of the future states of dynamic objects (e.g., locations, trajectories, poses, etc.), the vehicle may determine driving maneuvers earlier and with greater accuracy, which may improve safety outcomes and driving efficiency. Further, the predictive performance of the ML models when encountering low-frequency driving scenarios and/or low-frequency objects can be improved even when the same ML models and same training data sets and training techniques are used. Thus, these techniques require significantly less amounts of training data and processing resources to accurately model low-frequency situations, and may obviate the need to add large amounts of new training data and use additional computing resources to train larger and more robust models to cover low-frequency situations. These and other improvements to the functioning of computing devices are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In one example, the techniques described herein may be utilized in driver-controlled vehicles in which such a system may provide an indication to a driver of the vehicle of whether it is safe to perform various maneuvers. In another example, the techniques can be utilized in an aviation or nautical context, or in any system involving objects or entities that may be associated with behavior that is unknown to the system. Such techniques may also be used, for example, in the context of manufacturing and assembly to inspect components as they move down an assembly line. Additionally, the techniques described herein can be used with real data (e.g., captured using sensor(s)), simulated data (e.g., generated by a simulator), or any combination of the two.

FIG. 1 is a pictorial flow diagram of an example process 100 of using ML prediction models based on modified map data to determine future predicted states for dynamic objects in the environment. As shown in this example, some or all of the operations in the example process 100 may be performed by a vehicle 102 (e.g., an autonomous vehicle) including a prediction component 104. As described below in more detail, the prediction component 104 may include various subcomponents, such as a number object/feature ML models, heuristics to associate object data/feature to map data modifications, and/or ML prediction models configured output future predicted dynamic object states based on multi-channel representations of an environment.

At operation 106, the vehicle 102 may capture sensor data of an environment, and determine various objects and object features in the environment based on the sensor data. Additionally or alternatively, the vehicle 102 may receive the sensor data from another vehicle in the environment (e.g., via a wireless transceiver) or from infrastructure (e.g., one or more remote computing devices). Objects detected by the vehicle 102 may include any types/classifications of static objects (e.g., buildings, road surfaces, trees, signs, barriers, parked vehicles, road debris, etc.), or dynamic objects (e.g., other vehicles, motorcycles, bicycles, pedestrians, animals, etc.) detected by the sensors of the vehicle 102. In some examples, the operation 106 can include receiving sensor data captured by another vehicle or infrastructure device and sent to the vehicle 102.

An object feature may refer to a visual feature or any other attribute of an object and/or another object associated with an object detected by the vehicle 102. For example, for a pedestrian, the associated object features may include any items being carried by the pedestrian (e.g., handheld signs, bags, equipment, etc.) wheeled vehicles controlled by the pedestrian (e.g., a stroller, shopping cart, luggage cart, gurney, etc.), an animal associated with the pedestrian (e.g., dog, cat, horse, etc.), and/or a uniform being worn by the pedestrian (e.g., a high-visibility construction vest, law enforcement or medical personnel uniform, etc.). For a vehicle, the associated object features may include a particular vehicle type or usage (e.g., school bus, construction vehicle, police car, ambulance or emergency vehicle, etc.), a feature indicating whether or not the vehicle is currently parked and/or disabled (e.g., vehicle damage, an open door, passengers in the vehicle, hazard lights and/or other signals on the vehicle, etc.). Various other examples of object features are described herein, and may include any perceivable attributes associated with any static object (e.g., a road surface feature, building feature, etc.) or dynamic object detected in the environment.

In this example, a driving scene 108 is depicted showing a current environment of the vehicle 102. The driving scene 108 may be depicted as an image captured by image sensors (e.g., cameras) of the vehicle 102, and/or may be based on various other types of sensor data captured by the vehicle 102 (e.g., lidar data, radar data, etc.). As shown in driving scene 108, the environment of the vehicle 102 includes a pedestrian 110 with a handheld stop sign, and another vehicle 112 approaching the pedestrian 110. As in this example, certain object types and/or object features may be associated with certain traffic control directives. For instance, a construction worker, handheld stop sign, temporarily construction road sign, and/or a police officer making hand gestures may be examples of object types and/or features that are associated with traffic control directives for stopping, yielding, changing lanes, etc. As described below in more detail, when object types and/or features associated with traffic control directives are detected, the prediction component 104 may modify the map data to temporarily add a map feature corresponding to the same or a similar traffic control directive (e.g., a stop sign, yield sign, traffic light, etc.). Additionally, because the associated map data features (e.g., stop signs, traffic lights, etc.) may be encountered much more frequently in driving environments than the relatively infrequently perceived object types/features (e.g., a construction working with a handheld stop/slow sign, etc.), the training data used to train the ML prediction models may include many more instances of the associated map data features in comparison to the infrequent object type/feature combinations. Accordingly, by temporarily adding map features associated with the same traffic control directive(s) into the map data representation of the driving environment used by the models, the ML models may provide more accurate real-time predictions of the behaviors of dynamic objects.

To detect objects and/or object features in the environment, the vehicle 102 may include various sensor types used to capture different sensor data types (or modalities) as the vehicle 102 traverses the environment. The vehicle 102 may include, among other sensors, one or more cameras configured to capture image data (e.g., individual images and/or video), audio sensors (e.g., microphones) configured to capture sound, radar sensors configured to capture radar data, and/or lidar sensors configured to capture lidar data, etc. Images and other sensor data captured by the vehicle sensors may be analyzed to detect objects, either independently of or in conjunction with the detection of the objects by the other vehicle sensors. Once detected, in some examples, the image data/sensor data may be cropped to an area of interest surrounding the objects, e.g., based on size (centimeters, pixels, etc.) surrounding individual objects, based on a bounding box surrounding the object, and so forth. After detecting objects and/or object features based on the sensor data, the vehicle 102 may determine various attributes, such as the size, position, pose, orientation, velocity, acceleration, and the like, for the object.

In some examples, the vehicle 102 may use trained ML models, such as convolutional neural networks (CNNs) and/or ML models (e.g., recurrent neural networks, graph neural networks, other artificial neural networks, etc.) to detect and classify any of the specific objects and/or object features described herein. For instance, any number of specialized trained object feature ML models may be used by the prediction component 104 and/or other components of the vehicle 102 (e.g., a perception component) to detect specific object features or combinations of objects and object features. These models may use sensor data captured by the vehicle sensors as input, and may output detected objects, object types, object features, object locations, and/or other object attributes. In various examples, specialized object feature models may be trained to identify specific object features (e.g., handheld signs, pedestrian hand signals, hinged stop signs on bus schools, different uniform types, different construction equipment types, different construction road signs/markers, etc.), based on the size, shape, color, and/or movement patterns associated with the objects and/or other associated objects. The trained object feature models may receive image data as input, and/or may receive other types of input data (e.g., lidar point clouds, audio data, radar data, etc.), and may output determinations of object features (and/or combinations of object features) associated with the objects detected in the environment.

As noted above, in some cases the trained object feature ML models may use CNNs and other types of neural networks trained to detect and recognized specific object features. As described herein, an exemplary neural network is a biologically inspired algorithm that passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters. Although discussed in the context of neural networks, any type of machine learning can be used consistent with this disclosure. In some examples, the prediction component may include processor-executable instructions stored in a memory of the vehicle computing device(s) and/or accessible thereto, hardware, and/or some combination thereof (e.g., a field-programmable gate array (FPGA), application-specific integrated circuit (ASIC)).

At operation 114, the vehicle 102 may determine associated map features and map locations, based on the object features detected by the vehicle in operation 106. In some examples, the prediction component 104 may use heuristics data such as association tables, sets of mapping rules, etc., to determine which map features are to be added/removed from the map data based on the object features detected by the vehicle 102. In this example, box 116 includes an association table with three columns, an object type column 118, an object feature column 120, and a map data feature column 122, that can be used to associate combinations of object types and object features to corresponding map features. The example association (or mapping) shown in box 116 may indicate that when the vehicle 102 detects a pedestrian holding a handheld sign, the prediction component 104 may add a stop sign to the map data at a map location corresponding to the location of the pedestrian.

Although box 116 shows a simplified example of a single association (or mapping), in other examples any combination of objects and/or object features may be associated with any map feature (or combination of map features). For instance, an object such as a pedestrian, vehicle, static object, or road surface feature, having a specific set of detectable object features, or any combination of such objects, can be associated with fixed map features such as traffic signs or signals, crosswalks, lanes, speed bumps, etc. As noted above, the object types of the perceived objects/features may be different from the map feature type of the associated map features, such as replacing a pedestrian crossing guard detected by the vehicle 102 with a crosswalk map feature, or replacing a school bus detected by the vehicle 102 with a stop sign map feature, and the like.

In some examples, certain object features may be relevant to the prediction component 104 (e.g., may cause a modification to the map data) when they are associated with some object types but not with other object types. For instance, a red octagonal stop sign shape may be a relevant object feature when associated with a pedestrian standing in the road, but might not be a relevant object feature when it is painted on a billboard or the side of truck, etc. As another example, a pedestrian making hand gestures for a traffic control directive may cause a modification to the map data when the pedestrian is a law enforcement officer or construction worker, but not when the pedestrian is a child, a jaywalker, or other normal pedestrian. Therefore, the association table shown in box 116 and/or other heuristics used by the prediction component 104 may include specific combinations of object types and object features, that can be associated with specific map features.

Although this example shows only one object feature associated with one map feature, in other examples the heuristics used by the prediction component 104 may define associations between any number of object features and one or more corresponding map features. For instance, the prediction component 104 may use similar heuristics to determine a stop sign map feature in response to detecting a pedestrian having a first feature (e.g., wearing a law enforcement uniform or high-visibility construction vest), a second feature (e.g., standing in the road or on the shoulder), a third feature (e.g., holding a stop sign, yield sign, or slow sign), a fourth feature (e.g., in the vicinity of construction equipment, lane markings, a disabled vehicle or accident scene, etc.) and so on.

Additionally or alternatively, the prediction component 104 may use heuristics that associate other environment-related data with specific map features and/or specific modifications to the map data. Such environment-related data may include, but is not limited to, the current weather conditions (e.g., rain, snow, fog, etc.), the current road conditions, the current light/darkness conditions, the current traffic conditions, the current driving region or driving environment (e.g., rural or city driving, etc.), and the like. The prediction component 104 may use heuristics that define a combination of objects/object features with one or more environment-related data features, and then associate the combination with a map feature to be added/removed from the map data.

In the example shown in box 116, the heuristics defines a combination of object type and object features that may cause the prediction component 104 to add a map feature (e.g., a stop sign) into the map data. The new map feature may be added at the same location in the map data corresponding to the location of the pedestrian in the physical environment. However, in other examples, the heuristics may define combinations of object types and features (and/or other environment-related data features, as described above) that may cause the prediction component 104 to remove existing map features, instead of or in addition to adding new map features. For instance, the addition of a new map feature (e.g., a stop sign map feature) into the map data at a map location may obviate one or more existing map features (e.g., fixed stop signs, yield signs, crosswalks, traffic lights, etc.) at or near the same map location of the added feature. Accordingly, the heuristics may also define the conditions for removing existing maps features, including combinations of object types/features, environment-related data features, distance thresholds and/or directions from newly added features, etc.

Further, as noted above, the prediction component 104 may infer additional physical objects/features at different locations than the objects/features directly perceived using the sensor data. For example, when the vehicle 102 perceives a construction flagger holding a slow/stop sign and/or lane markers at one side of a construction area or intersection, the prediction component 104 may infer additional construction flaggers (e.g., holding a similar slow/stop sign with the opposite face forward) and/or similar lane markers at another side of the intersection or construction area. In such cases, the heuristics used by the prediction component 104 may be defined to add and/or remove map features from the map data based on inferred objects/features rather than those directed perceived by the vehicle 102. Additionally, although heuristics are described in certain examples herein for determining map data features associated with perceived object data (e.g., object types and/or features), in other examples the prediction component 104 may use specialized ML models trained to output map data features based on input sensor data. For instance, an ML model may be generated and trained using the various techniques described herein to output one or more new map data features to be added to the map data (e.g., including map feature types, map locations, orientations, etc.) and/or existing map features to be removed (or disregarded) from the map data, based on input object data (e.g., object types, features, locations, etc.).

At operation 124, the prediction component 104 may modify the map data representing the environment, to add/remove the map features determined by the heuristics in operation 114. Map data, which also may be referred to herein as scene context data and/or static scene data, includes data representing a number of fixed and/or static features within an environment. In some examples, the map data may be based on the maps provided to the vehicle 102 and used by the vehicle to navigate within the environment. For instance, maps may be stored as N-dimensional data structures that provide information about an environment, including but not limited to, topologies (such as intersections), streets, mountain ranges, roads, terrain, and the environment in general. The map data also may include map features representing fixed elements within the environment, including but not limited to roads, lanes, curbs, shoulders, crosswalks, buildings, trees, medians, street signs, traffic signals, speed limits, etc.

In various examples, map data may be stored as multi-dimensional data and may include any number of data channels corresponding to different data modalities and/or types of map features within the environment. In some cases, map data may include a three-dimensional mesh of the environment. Additionally or alternatively, the map data can be stored in a tiled format, such that individual tiles of the map represent a discrete portion of an environment, and can be loaded into working memory as needed. The map data representing the static scene context of the environment may be represented in a top-down view, elevation view, and/or a side view. Using such views of the map data, the vehicle 102 may navigate and perform driving maneuvers within the environment. For instance, the map data can be used in connection with a localization component, perception component, prediction component 104, and/or planning component of the vehicle 102 to determine the location of the vehicle 102 within the environment, identify objects in the environment, and/or generate routes and/or trajectories to navigate within an environment.

In some cases, the vehicle 102 may generate the map data based on a combination of sensor data and preexisting maps received from remote (e.g., off-vehicle) map data sources. For example, the sensor data captured by the vehicle sensors and the maps received remote map data sources may be processed to determine a feature map representing the current region in the environment. Certain features in the feature map (e.g., crosswalks, street signs, traffic signals, speed limits, etc.) may be associated with particular roads, driving lanes, and/or directions of travel within the map data. For instance, a map feature such as a stop sign or traffic light represented at a location in the map data may apply to specific object types (e.g., vehicles and bicycles) and not to others, and/or may apply to objects moving in specific lanes or directions relative to the map feature, but not to objects in other lanes or moving in other directions.

In this example, box 126 depicts a top-down view of the same environment shown in driving scene 108. The top-down view depicted in box 126 includes both map data representing the static scene context of the environment, and the dynamic objects detected by the vehicle 102 (e.g., the pedestrian 110 and vehicle 112). Based on the heuristics (as described above in operation 114), the prediction component 104 determines that a stop sign map feature should be added to the map data in response to detecting the pedestrian 110 with a handheld stop sign. Accordingly, as shown in this example, the prediction component 104 adds a new stop sign map feature 128 at the location of the pedestrian 110 relative to the road, and orients the stop sign map feature to face in the same direction as the pedestrian 110.

At operation 130, the prediction component 104 may use the modified map data of the environment generated in operation 124 and the perceived object data for the dynamic objects in the environment to determine one or more predicted future states for the other dynamic objects. As depicted in box 132, the prediction component 104 may provide both the modified map data 134 representing the static scene context of the environment, and object data 136 representing the current perceived objects, to one or more ML predictions models 138 configured to output future state data for the dynamic objects in the environment.

In some examples, the prediction component 104 may generate a multi-channel representation of the environment based on the combination of the modified map data 134 and object data 136, and then provide the multi-channel representation as input to the ML prediction models 138. To generate a multi-channel representation, the prediction component 104 may overlay or otherwise merge the various objects and/or features perceived by the vehicle 102 onto the map data that defines the static scene context of the environment. As noted above, multi-channel representations may include top-down view representations stored as image data (and/or other sensor data), and/or may include graph-based representations stored as graph neural networks (GNNs). Within a top-down, graph-based, or any other type of multi-channel representation, the different channels in the representation may store data based on different sensors and/or sensor modalities, different types of objects, object features, environmental features, etc. Additionally, multi-channel representations may include historical data associated with the dynamic objects in the environment, representing states of the dynamic objects at the current time and one or more previous timesteps.

The ML prediction models 138 may be trained to receive multi-channel representations of an environment, and to output predicted future state data for any of the dynamic objects in the environment. For instance, the trained ML prediction models 138 may output predicted locations, trajectories, poses, and/or any other predicted state data for the pedestrians, bicycles, and/or vehicles in the environment, for one or more future timesteps after the current time of the multi-channel representations. For instance, in this example, the ML prediction models 138 may predict future locations, trajectories, poses, and driving maneuvers for the vehicle 112. Then, based on the predicted future states of the dynamic objects, the vehicle 102 may determine and execute trajectories and/or driving maneuvers to safely and efficiently navigate the environment.

Additional techniques and examples of using trained ML models to predict object trajectories based on top-down multi-channel representations of driving environments can be found in U.S. Pat. No. 11,169,531, filed Oct. 4, 2018, and entitled "Trajectory Prediction on Top-Down Scenes," and in U.S. patent application Ser. No. 16/504,147, filed Jul. 5, 2019, and entitled "Prediction on Top-Down Scenes based on Action Data," the entire contents of which are incorporated herein by reference for all purposes. Additional examples and techniques for using trained ML models to perform prediction based on top-down representations of environments can be found in U.S. patent application Ser. No. 17/232,534, filed Apr. 16, 2021, and entitled, "Boundary Aware Top-Down Trajectory Prediction," the entire contents of which is incorporated herein by reference for all purposes. Further examples and techniques for using trained ML models to perform prediction based on graph-based representations of environments can be found in U.S. patent application Ser. No. 17/535,357, filed Nov. 24, 2021, and entitled, "Encoding Relative Object Information Into Node Edge Features," the entire contents of which is incorporated herein by reference for all purposes.

As described above, by modifying the map data representing the static scene context of the environment, and then using the modified map data 134 as direct or indirect input to the ML prediction models 138 (e.g., by generating a multi-representation), the resulting output of the ML prediction models 138 may include more accurate and reliable predictions of the future states of the dynamic objects. For example, because the specific pedestrian 110 (e.g., a construction flagger having a particular appearance, uniform, and holding a particular sign, etc.) is a relatively low-frequency object, the training data for the ML prediction models 138 may include relatively few or no scenarios having pedestrians with similar features to the pedestrian 110. As a result, the trained ML prediction models 138 may be susceptible to misinterpreting the effect of the pedestrian 110 on the vehicle 112 and/or other dynamic objects in the environment. In contrast, the training data for the ML prediction models 138 may include many examples of the behaviors of dynamic objects in response to encountering stop signs. Therefore, by analyzing the low-frequency pedestrian 110 and encoding a new stop sign map feature 128 into the modified map data based on the pedestrian 110, the trained ML prediction models 138 may output much more robust and accurate predictions of the behaviors of the dynamic objects.

FIGS. 2A-2D depict four different examples of objects and/or object features that may be perceived by a vehicle 102 and used to determine corresponding updates to map data. In these examples, image data is shown depicting various objects, which may include image data captured by one or more cameras of the vehicle 102. In other examples, the vehicle 102 may perceive objects and/or object features based on image data and/or other combinations of sensor data modalities, such as lidar data captured by lidar sensors, radar data captured by radar sensors, sonar data captured by sonar sensors, audio data captured by microphones, etc. The images shown in FIGS. 2A-2D may be analyzed to detect objects and object features, either independently of or in conjunction with the detection of the objects by the other vehicle sensors. Once an object is detected (e.g., a pedestrian, vehicle, bicycle, etc.), a perception component of the vehicle 102 may determine various attributes of the object, such as the size, position, pose, orientation, velocity, acceleration, and the like, for the object. Additionally, to detect various object features, in some cases specific portions of the image data/sensor data representing the object may be cropped to an area of interest within a bounding region of the object, or a region surrounding the objects. Such regions may be based on size (centimeters, pixels, etc.) surrounding the objects, based on a bounding box surrounding the object, and so forth.

Figure 2A:
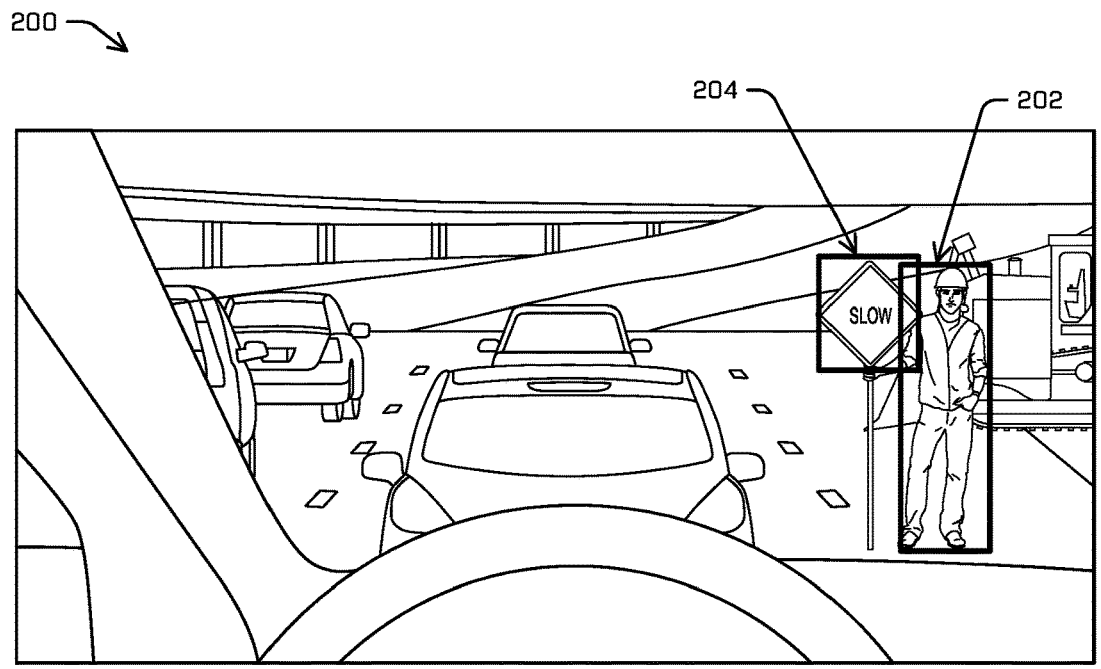
FIGS. 2A-2D depict four examples of objects including features that may be detected by trained ML models, in accordance with one or more examples of the disclosure.

FIG. 2A depicts a scene 200 including a construction flagger 202 standing in front of a construction area, and holding a reversible stop/slow sign 204 to alert approaching vehicles to the construction area and to manage the traffic passing through the lane closure of the construction area. In this example, a perception component of the vehicle 102 may analyze the image data of the scene (and/or other sensor data) and identified the construction flagger 202 as a pedestrian object and the handheld stop sign 204 as an object feature.

Figure 2B:
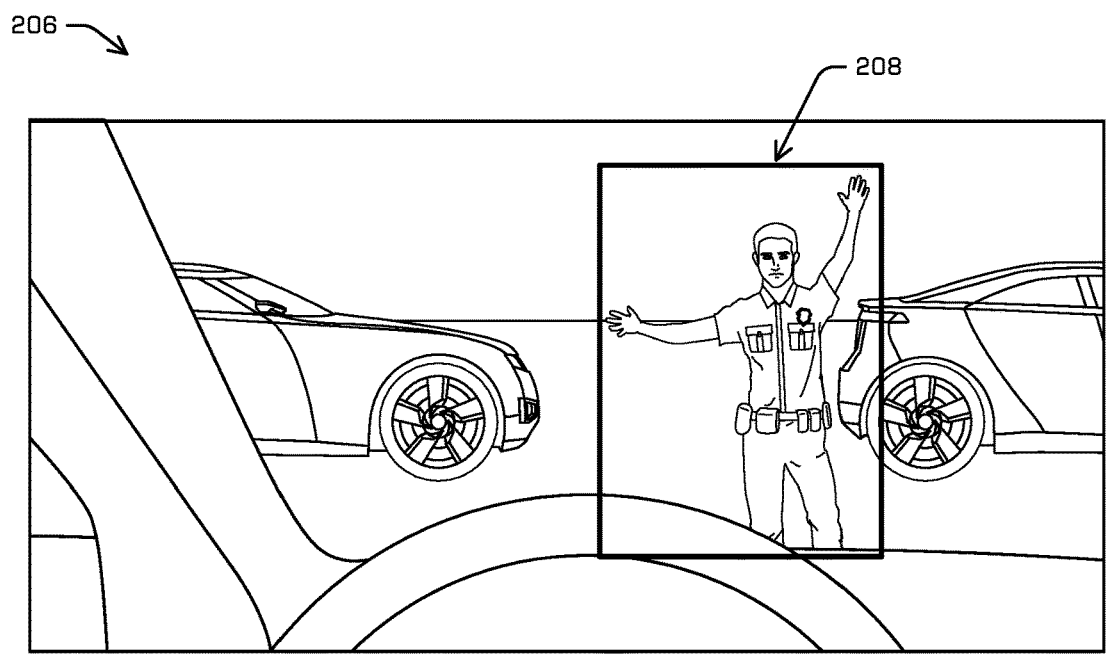

FIG. 2B depicts another scene 206 including a police officer 208 standing in a four-way intersection. The police officer 208 in this example is using arm and hand gestures to control the flow of vehicles through the intersection. In this example, the perception component of the vehicle 102 may analyze the image data of the scene (and/or other sensor data) and identified the police officer 208 as a pedestrian object and the uniform and/or arm and hand movements/gestures of the police officer as object features.

Figure 2C:
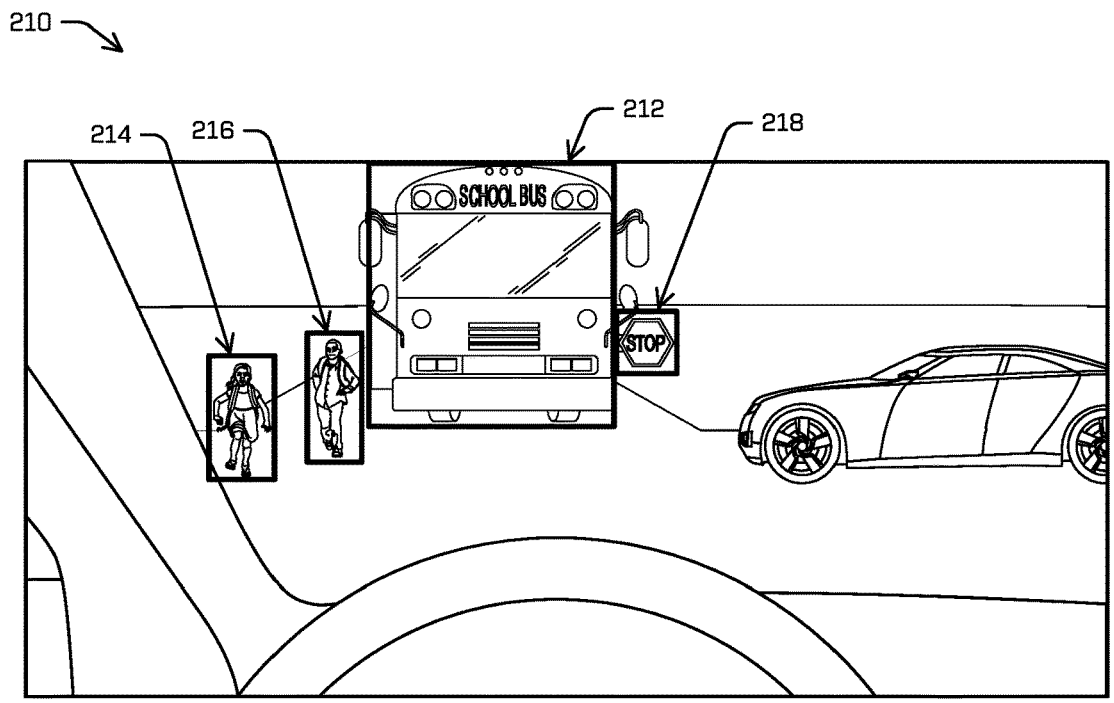

FIG. 2C depicts another scene 210 including a school bus 212 stopped to allow children to exit the bus. In this example, the perception component of the vehicle 102 may analyze the image data of the scene (and/or other sensor data) and identified the school bus 212 as a vehicle object, the children 214 and 216 as pedestrian objects, and the color/labeling of the bus and the hinged stop sign 218 on the bus as an object feature.

Figure 2D:
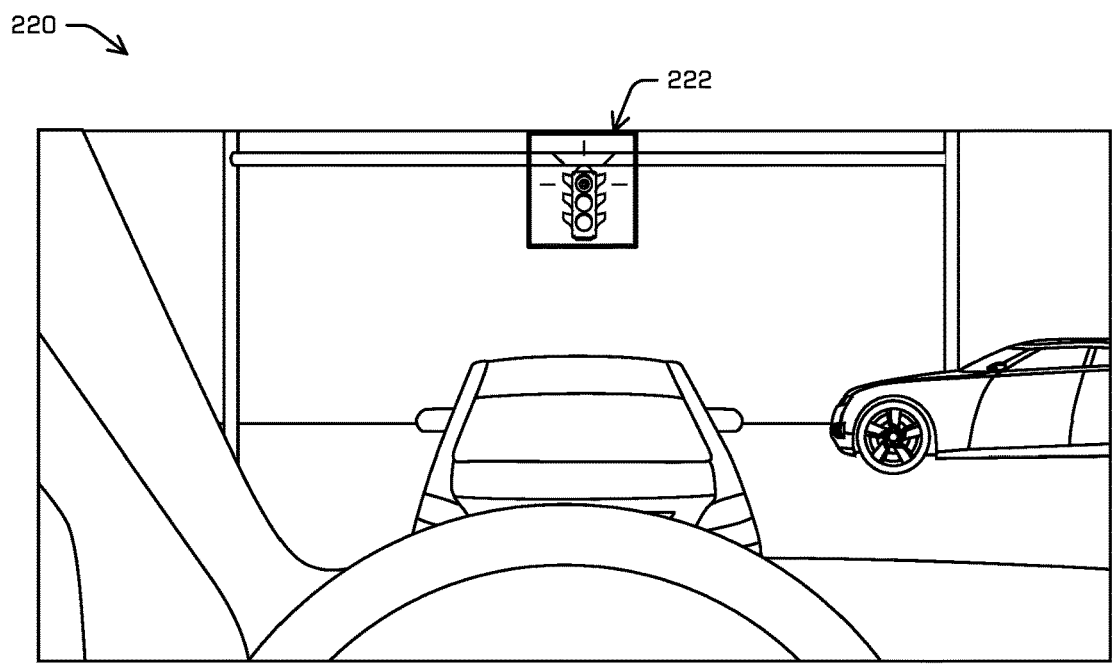

FIG. 2D depicts another scene 220 including a malfunctioning traffic light 222 that is flashing red, and a number of vehicles stopped at the intersection. In this example, the perception component of the vehicle 102 may analyze the image data of the scene (and/or other sensor data) and identify the traffic light 222 as a static object and the flashing red lights as an object feature.

Figure 3:
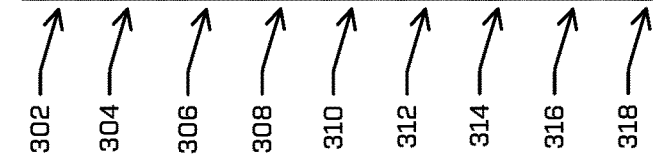
FIG. 3 depicts an example table defining a set of heuristics associating object types and perceived object features with map feature types and/or actions, in accordance with one or more examples of the disclosure.

FIG. 3 depicts an example table 300 defining a set of heuristics associating object types and perceived object features with map data modifications. In this example, each of the rows 302-312 in table 300 defines a relationship (or association) between a set of perceivable conditions (e.g., objects and object features) and a corresponding modification to the map data (e.g., a map feature to be added or removed).

In this example, table 300 is an association table with three columns. When the vehicle 102 perceives an object having a particular object type in the table 300, and that object includes or is associated with a particular object feature, then the prediction component 104 may retrieve the map data features associated with (e.g., in the same row as) the object type and object feature combination, to determine what map data modification to perform.

Although table 300 is a relatively simple example, in which the combination of an object type and single object feature is associated with a single map feature, any type of more complex heuristics may be used in other examples. For instance, as described above, a heuristics table (or other heuristics data structure/algorithm) used by the prediction component 104 may define associations between any number of objects types, object features, and any number of corresponding map data modifications. Additionally or alternatively to objects and object features, the heuristics data may include heuristics that associate any other environment-related data with specific map features and/or map data modifications. For instance, the heuristics may define a combination of any number of objects and/or object features with any number of environment-related features, and then associate the combination with one or more map features to be added/removed from the map data. As noted above, the heuristics also may define the corresponding map location at which a map feature is to be added and/or removed. In some cases, the map location may match the location of the object perceived in the environment. However, in other cases existing map features at other locations may be removed from the map data, and/or new map features may be added at other locations (e.g., based on the prediction component 104 inferring objects at the other locations).

In some examples, mappings such as those in table 300 may include associations of multiple map data features to a set of perceived object data (e.g., object types and/or features). For instance, a bus having a hinged stop sign out as shown (e.g., row 312) can be mapped to a stop sign map feature, a yield sign map feature, and/or a traffic light map feature. Additionally, certain map features may be compatible with certain map locations and not with other map locations. As an example, one or more ML models used by the prediction component 104 may require that traffic light map features must occur at junctions (e.g., intersections) in the map data and cannot occur at non-junction map locations. In this example, the prediction component 104 may associate a bus object having a hinged stop sign with a traffic light feature when the bus is within a predetermined distance threshold (e.g., 5 feet, 10 feet, etc.) of a junction, but may associate the same bus object with a stop sign when the bus is not within the distance threshold of a junction. Additionally or alternatively, for an object associated with one or more traffic control directives, the prediction component 104 may determine from multiple possible map features to replace the object based on whether the ML models include a sufficient amount of training data for the map features within the context of the current driving environment.

Figure 4:
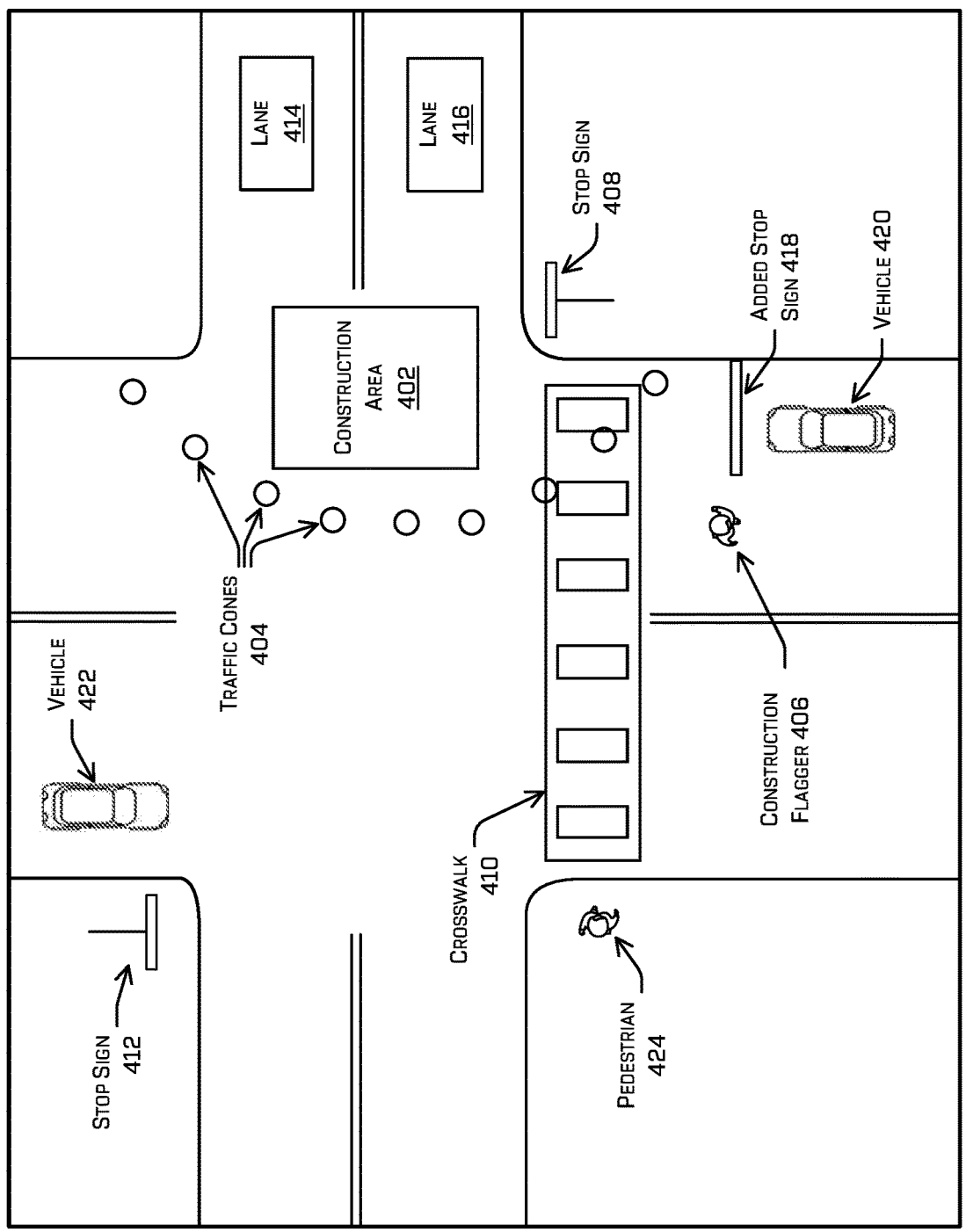
FIG. 4 depicts an example driving environment including static map data of the environment, and object data determined based on sensor data captured by a vehicle, in accordance with one or more examples of the disclosure.

FIG. 4 depicts a top-down view of an example of a driving environment 400 associated with a vehicle 102. In this example, the driving environment 400 includes object data determined based on sensor data captured by the vehicle 102, as well as a combination of predefined and modified map features representing the static scene context of the environment. As shown in this example, the driving environment 400 corresponds to a four-way intersection including a construction area 402 partially blocking the intersection and a number of traffic lanes. The vehicle 102 perceiving the driving environment 400 is not depicted in the top-down view, but may be currently positioned either within or just outside the visible top-down view of the driving environment 400.

In this example, a vehicle 102 traversing within or near the driving environment 400 has detected, based on captured sensor data, a construction area 402 marked-off by an arrangement of traffic cones 404, and a construction flagger 406 (e.g., a pedestrian with a handheld stop/slow sign). The view of the driving environment 400 also depicts a number of map features based on map data representing the static scene context of the driving environment 400. The prediction component 104 of the vehicle 102 may overlay or merge the objects/features onto the map data as described above, or vice versa, to generate the depicted view of the driving environment 400. A number of predefined map features are shown in the driving environment 400, including the stop sign map feature 408, the crosswalk map feature 410, the stop sign map feature 412, and the lane map features 414 and 416.

In addition to the predefined map features, the prediction component 104 in this example has determined a new stop sign map feature 418 to be added to the map data based on the detection of the construction area 402 and construction flagger 406. As shown in the driving environment 400, the prediction component 104 has positioned the new stop sign map feature 418 at the corresponding location of the construction flagger 406 with respect to the oncoming traffic, and has oriented the new stop sign map feature 418 based on the direction that the construction flagger 406 is facing.

As discussed above, in some examples the prediction component 104 also may determine or more of the predefined map features to be removed from the map data, based on the detected objects/features in the environment. Although no predefined map features have been removed in this example, in some cases the prediction component 104 may determine based on heuristics to remove the predefined stop sign map feature 408, the crosswalk map feature 410, and/or lane map features 414 and 416, as being either obviated or inaccessible based on the construction area 402 and the new stop sign map feature 418.

Once the prediction component 104 has determined which map features to add or remove (if any) based on the detected objects/features in the driving environment 400, the prediction component 104 may generate one or more representations of the environment based on the combination of the current object data and the modified map data representing the modified static scene context. The representation of the driving environment 400, which may be a top-down image view representation similar to this example, a graph-based representation stored as a GNN, and/or various other types of multi-channel representations, may be provided to one or more ML prediction models to predict the future states (e.g., locations, trajectories, poses, etc.) of the dynamic objects in the driving environment 400. For instance, ML prediction models may be used, receiving a representation of the driving environment 400 (including the modified map data) as input to the models, which may output predicted future locations, trajectories, and/or poses of the vehicle 420, the vehicle 422, and/or the pedestrian 424.

Figure 5:
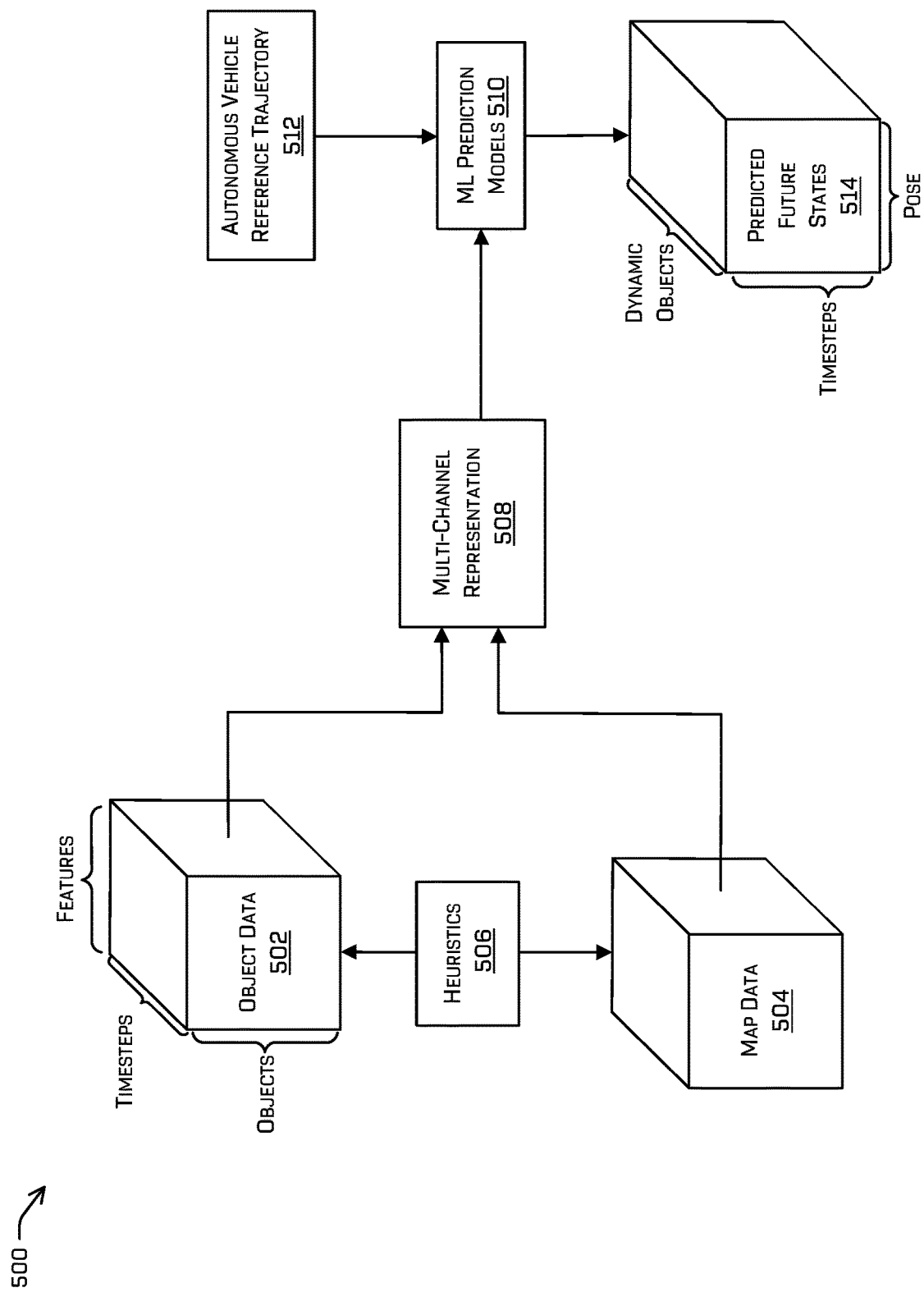
FIG. 5 depicts a block diagram of an example architecture for encoding features in a driving environment into a multi-channel representation, and providing the multi-channel representation to an ML prediction model to predict the future states of dynamic objects in the environment, in accordance with one or more examples of the disclosure.

FIG. 5 is a block diagram depicting an example of an architecture 500 for encoding features in an environment into a multi-channel representation, and using ML prediction models to predicted future states of dynamic objects in the environment. In some cases, the architecture 500 may be implemented within a prediction component 104 of a vehicle 102, or may be implemented across a combination of multiple vehicle components (e.g., a perception component, localization component, prediction component, planning component, etc.). As shown in this example, the architecture 500 may include a number of different ML models, including ML models used to identify particular object types and/or features, map features, and/or separate ML prediction models 510 used to predict future states for objects in the driving environment. In some examples, any of the various ML models described herein may be configured as RNNs and/or CNNs, and may be implemented within a perception component of the vehicle 102. Additionally or alternatively, the ML prediction models 510 may be configured as top-down image-based ML models (e.g., CNNs), or graph-based GNNs, and/or other neural networks, and may correspond to any of the ML prediction models 138 described with respect to FIG. 1.

As shown in architecture 500, object data 502 may include object data and features data over a number of previous timesteps. As discussed above, the object data 502 may include any object-related data (e.g., object types, locations, poses, velocity vectors, etc.) and/or environment-related data perceived by the vehicle 102 based on the sensor data captured by the vehicle 102. In some examples, the object data 502 may be based on previous iterations of the object data ML model(s) (e.g., CNNs or GNNs) and may include the features associated with each entity or object in the environment at each of the previous timesteps. The ML model(s) used to determine object types and/or features may be configured to process the historical data of the object data 502 at previous timesteps to determine object features for each object at the current timestep. The object features within the object data may include any number of channels corresponding to the different features, types of features, sensor modalities, etc., for each object in the environment at the current timestep.

The map data 504 may include map features representing the static scene context data associated with an environment. In some examples, the map data 504 may be determined based on maps stored on the vehicle and/or received from remote computing devices. Additionally or alternatively, map data 504 may be based in part on sensor data captured by the vehicle 102 within the environment. While not depicted in FIG. 5, the map data 504 representing the static scene context may be represented in a plan view, a top-down (or elevation) view, or a side view. Any number of ML models (not shown) may be configured to process the map data 504 to determine map features (or scene context features) associated with the environment. The map features within the map data 504 may include any number of channels corresponding to the static context features of the environment at the current timestep, where each channel may represent a feature (or a feature vector) at a position of the environment corresponding to a width and/or a height of the environment, capturing three-dimensional features of the environment represented by the sensor data.

Once the object data 502 and map data 504 have been determined for a current timestep, the prediction component 104 may modify the map data 504 by applying heuristics 506, as described above. The heuristics 506 may be implemented as one or more tables, rules, algorithms, etc., to add, remove, or modify (e.g., relocated) one or more of the map data 504 based on one or a combination of object features 506 perceived for the current timestep. Once the heuristics 506 have been applied and one or more features within the map data 504 have been modified (if needed), the prediction component 104 may generate a multi-channel representation 508 of the environment at the current timestep, based on the combination of the object data 502 and the map data 504. As described above, the prediction component 104 may generate the multi-channel representation 508 by overlaying or merging the object data 502 at the current timestep (including objects vectors and/or historical data based on previous timesteps) with the static scene context represented by the map data 504. The multi-channel representation 508 may be generated and represented using any number of techniques, including but not limited to top-down image-based multi-channel representations and/or graph-based multi-channel representations.

ML prediction models 510 may use the multi-channel representation 508 as input, and may output predictions of the states of various dynamic objects at one or more future timesteps. In some examples, executing the ML prediction models 510 may include updating the nodes of the ML prediction models 510 based on the object data 502 and the map data 504 (as modified) at the given timestep. In some cases, the ML prediction models 510 may output specific predictions of future states and/or distributions of predicted future states for one or more dynamic objects in the environment.

In some instances, various sampling techniques may be used to sample a single predicted future state for a dynamic object (e.g., a future location, trajectory, pose, etc.) from a distribution of predicted future states for the object. For example, such sampling techniques may be configured as a Gaussian sampling technique (e.g., following a sampling pattern based on a gaussian distribution), a most likely sampling technique (e.g., taking an average, such as the min, max, or mean of the distribution), or an overwrite sampling technique (e.g., selecting a specific position for an object that may or may not be included in the distribution). Additionally or alternatively, a sampling technique for sampling a predicted future state of an object may be determined based on a classification type of the object, the predicted positions of the object, a distribution type of the predicted position distribution, and/or the reference trajectory 512 of the vehicle 102, etc.

Once a number of predicted future states 514 have been determined for each dynamic object in the environment corresponding to a number of future timesteps (e.g., 8 predicted locations, poses, etc., for each object corresponding to 8 timesteps), the predicted future states 514 may be utilized to determine predicted trajectories for one or more of the dynamic objects, and to determine trajectories and/or driving maneuvers for the vehicle 102.

As discussed above, once the map data representing the static scene context has been modified based on the perceived objects/features, the prediction component 104 may generate a multi-channel representation of the environment based on the modified map data and the object data associated with the current timestep. The multi-channel representation may be provided to one or more ML prediction models configured to output predicted future states of the dynamic objects in the environment, such as predicted locations, trajectories, poses, and the like for any pedestrians or other vehicles in the environment. In various examples, the multi-channel representation of the environment may include a top-down representation stored as image data (and/or multi-channel feature data), and/or a graph-based representation stored as a GNN.

Figure 6:
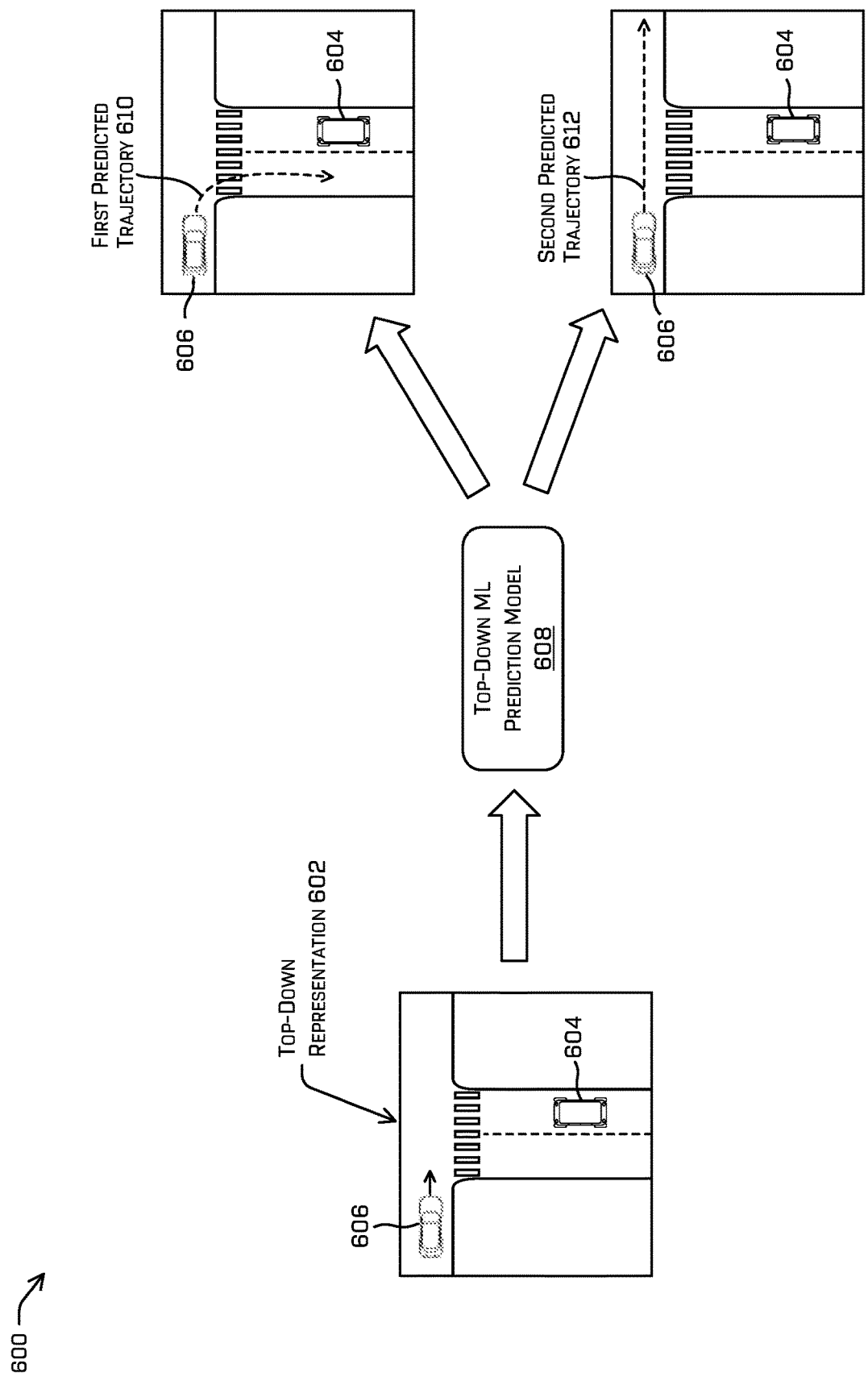
FIG. 6 illustrates an example technique for using ML prediction models based on a top-down image view representation of an environment to predict the future states of dynamic objects in the environment, in accordance with one or more examples of the disclosure.

FIG. 6 illustrates an example technique of providing a top-down representation of an environment to an ML prediction model to predict the future states of the dynamic objects in the environment. In this example, FIG. 6 depicts an example architecture and flow 200 of a system for processing a top-down representation 602 (e.g., image data) with a top-down ML prediction model 608 to determine one or more predicted trajectories for a dynamic object in the environment.

The multi-channel representation 602 in this example (e.g., a top-down representation) includes the vehicle 604 capturing the sensor data and performing the prediction models to predict the trajectory (and/or any other future state data) for another vehicle 606 in the environment. As shown in this example, the top-down ML prediction model 608 may output multiple predicted trajectories for the other vehicle 606. For instance, a first prediction trajectory 610 may be output based on the multi-channel representation including environmental information (e.g., lane markings, crosswalks, locations of traffic lights, building locations, etc.) and the data representing the vehicle 606 such as, for example, a velocity of the vehicle 606, the acceleration of the vehicle 606, the current state of the vehicle 606, a behavior class of the vehicle 606 (e.g., aggressive, cautious, law-abiding, inattentive, normal, etc.), and the like. As such, the first predicted trajectory 610 may be generated using a more computationally intensive model that utilizes data representing environmental information and data representing object information. This technique may utilize more data and more computing resources than a separate model/technique used to generate the second predicted trajectory 612.

In this example, the second predicted trajectory 612 may be configured to utilize only data within the multi-channel representation 602 representing the object information for the vehicle 606, and not the data representing the additional environmental information. As such, the second predicted trajectory 612 may be based on a kinematics-based model and/or algorithm that utilizes only data representing the object data for the vehicle 606 and not data representing environmental information, and thus may utilize less data and less computing resources than the techniques used to generate the first predicted trajectory 610. As a result, the second predicted trajectory 612 may be less complex predicted trajectory of the vehicle 606 (e.g., a straight trajectory having a distance based on a velocity of the vehicle 606). Additional examples and techniques for using trained ML models to perform prediction based on top-down representations of environments can be found in U.S. patent application Ser. No. 17/232,534, filed Apr. 16, 2021, and entitled, "Boundary Aware Top-Down Trajectory Prediction," the entire contents of which is incorporated herein by reference for all purposes.

Figure 7:
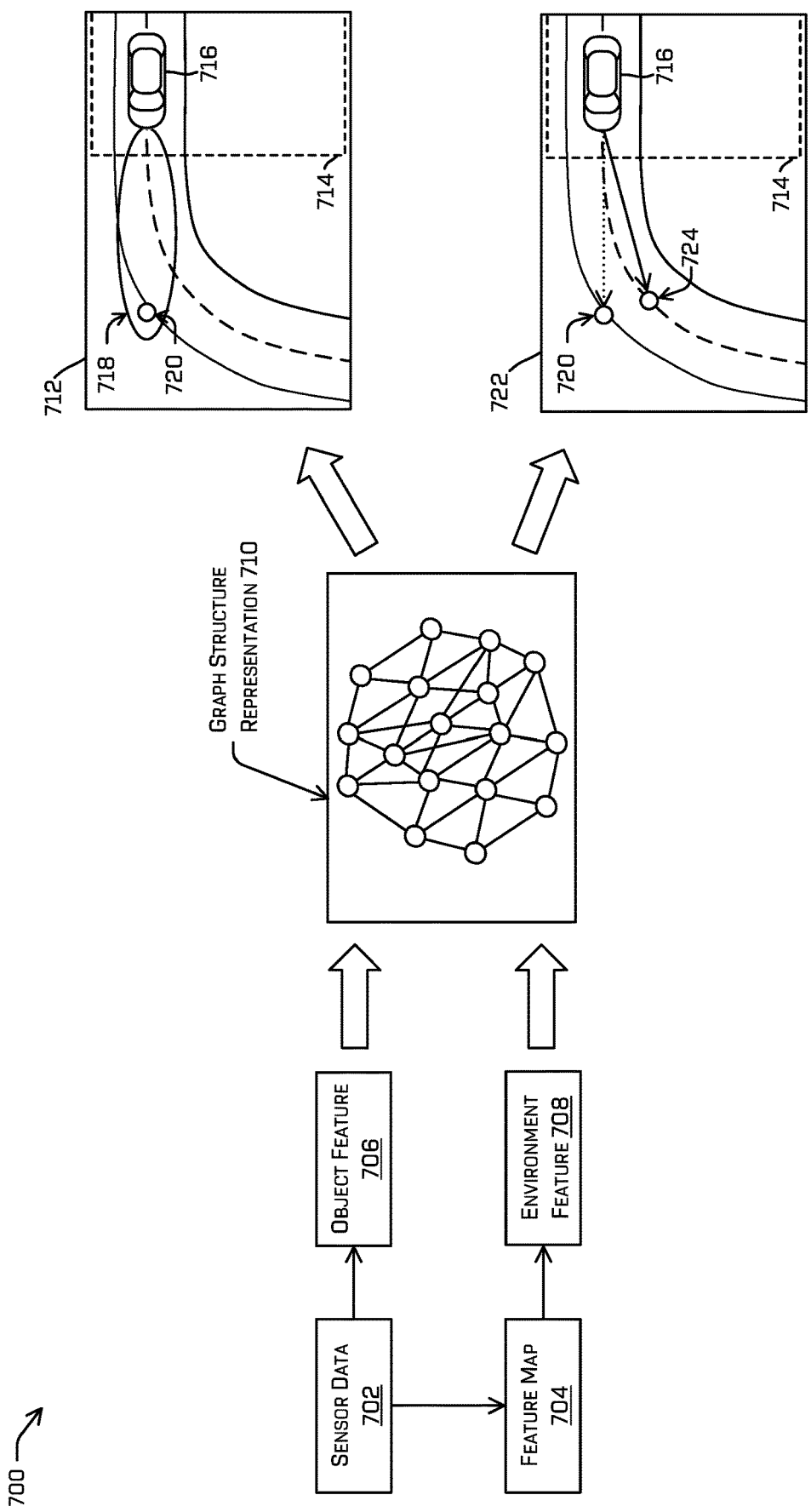
FIG. 7 illustrates an example technique for using ML prediction models based on a graph representation of an environment to predict the future states of dynamic objects in the environment, in accordance with one or more examples of the disclosure.

FIG. 7 depicts a diagram illustrating another technique of generating and providing a graph-based representation of an environment to an ML prediction model to predict the future states of the dynamic objects in the environment. Diagram 700 depicts a flow for capturing sensor data, encoding features into a node and an edge of a GNN, determining that a first predicted position of an object sampled from distribution data output by the GNN is outside of a specified area, and determining a second predicted position of the object based on map data.

In the example, a vehicle 102 may capture and/or receive sensor data 208 of an environment. The sensor data 208 may comprise image data, lidar data, radar data, sonar data, time-of-flight data, and/or depth data, etc. The vehicle 102 may use various techniques described herein to determine objects, object states, and/or features associated with the objects in the environment. For instance, a state of an object may include, but is not limited to, a pose of the object, a position of the object, an acceleration of the object, a speed of the object, a size of the object, a type of the object, alighting state of the object, and the like. In some examples, one or more object feature components of the vehicle 102 may determine object features associated with each object, by processing the object state data with a machine learned (ML) models. Additionally, the vehicle 102 may determine one or more features associated with the environment of the vehicle, including but not limited to roads, lanes, curbs, shoulders, crosswalks, buildings, trees, medians, street signs, traffic signals, speed limits, etc. Objects, object states and features, and/or environment features may be determined by a perception component of the vehicle 102 using ML models configured as RNNs or CNNs, etc.

The vehicle 102 also may receive map data representing various map features (or map elements) within the environment, including but not limited to roads, lanes, curbs, shoulders, crosswalks, buildings, trees, medians, street signs, traffic signals, speed limits, etc. In some cases, the map data may depict these and other types of permanent or semi-permanent map elements (e.g., road closures, road damage, construction sites, accidents, etc.), but might not include impermanent objects such other vehicles, bicycles, and pedestrians in the environment, or temporary road features such as disabled vehicles, road hazards, or short-term construction projects.

As shown in this example, the sensor data 702 captured by the vehicle 102 may be used to determine the object feature(s) 706 and a feature map 704 associated with an area of the environment, that may be used to determine the environment feature(s) 708. The prediction component 104 (or other components within the vehicle 102) may associate the object feature(s) 706 and the environment feature(s) 708 with a node of a graph structure. In some examples, the graph structure may be configured as a graph structure 710, a GNN, and/or a neural network. The prediction component 104 may generate and/or update the graph structure 710 to include the various object feature(s) 706 and/or the environment feature(s) 708. In some cases, a modeling component associated with the vehicle 206 may receive vectorized representations of objects (e.g., map elements and/or objects) from the object feature component and/or the environment feature component, and may create new nodes within the graph structure 710, remove nodes from the graph structure, and/or modify existing nodes of the graph structure based on the received map data and/or object data. Additionally, the modeling component may create and maintain edge features associated with node-pairs in the graph structure 710. The nodes in the graph structure 710 may store sets of attributes representing an object, and the edge features may include data indicating the relative information (e.g., positions, poses, etc.) of pairs of nodes. The graph structure 710 may include one or more nodes, associated with objects, and one or more edges connecting the nodes. Though not depicted in this example for clarity of illustration, in some cases, the graph structure 710 may be a fully connected structure in which each distinct pair of nodes is associated with a unique edge feature and/or edge data. Additionally, or alternatively, the graph structure 710 may include additional nodes for each object in the environment and/or additional edges connecting the additional nodes.

The graph structure 710 may be analyzed and/or provided as input to one or more ML prediction models, to determine predicted future states (e.g., locations, trajectories, poses, etc.) of the objects in the environment. In some examples, the output of such a model may represent distribution data based at least in part on the graph structure 710. In such examples, a distribution component associated with the vehicle 102 may determine the distribution data representing the predicted future states of the objects based on the updated graph structure 710. Additionally, or alternatively, the output may represent a single predicted state of an object in the future.

Box 712 illustrates an example output of the graph structure 710 representing the driving environment, a portion of the area of the environment 714, a dynamic object 716, and distribution data 718 indicating the predicted positions (illustrated as being overlayed on the environment for clarity) for the dynamic object 716, including a first predicted position 720 for the dynamic object 716.

As shown in box 722, in some examples, the prediction component 104 may use map data to project the first predicted position 720 sampled from distribution data 718 to a second predicted position 724. For example, the second predicted position 724 may be a center location of the lane on which the dynamic object 716 is traveling. In some examples, a reference line may be determined based on the current position of the dynamic object 716 and the map data. For example, a reference line from the current position of the dynamic object 716 to a location in the lane (e.g., the second predicted position 724) may be determined based on a distance that is substantially similar to that of a distance from the current position of the dynamic object 716 to the first predicted position 720 sampled from the distribution data 718. Additionally, or alternatively, the reference line may be altered based on a vehicle dynamics model, such as, for example, a distance of the reference line from a current position to a predicted position. For example, the distance of the reference line may be shortened or extended based on a vehicle dynamics model configured to model real-world actions of the dynamic object 716, such as, for example, slowing down around a curve, accelerating out of a turn, etc.

Figure 8:
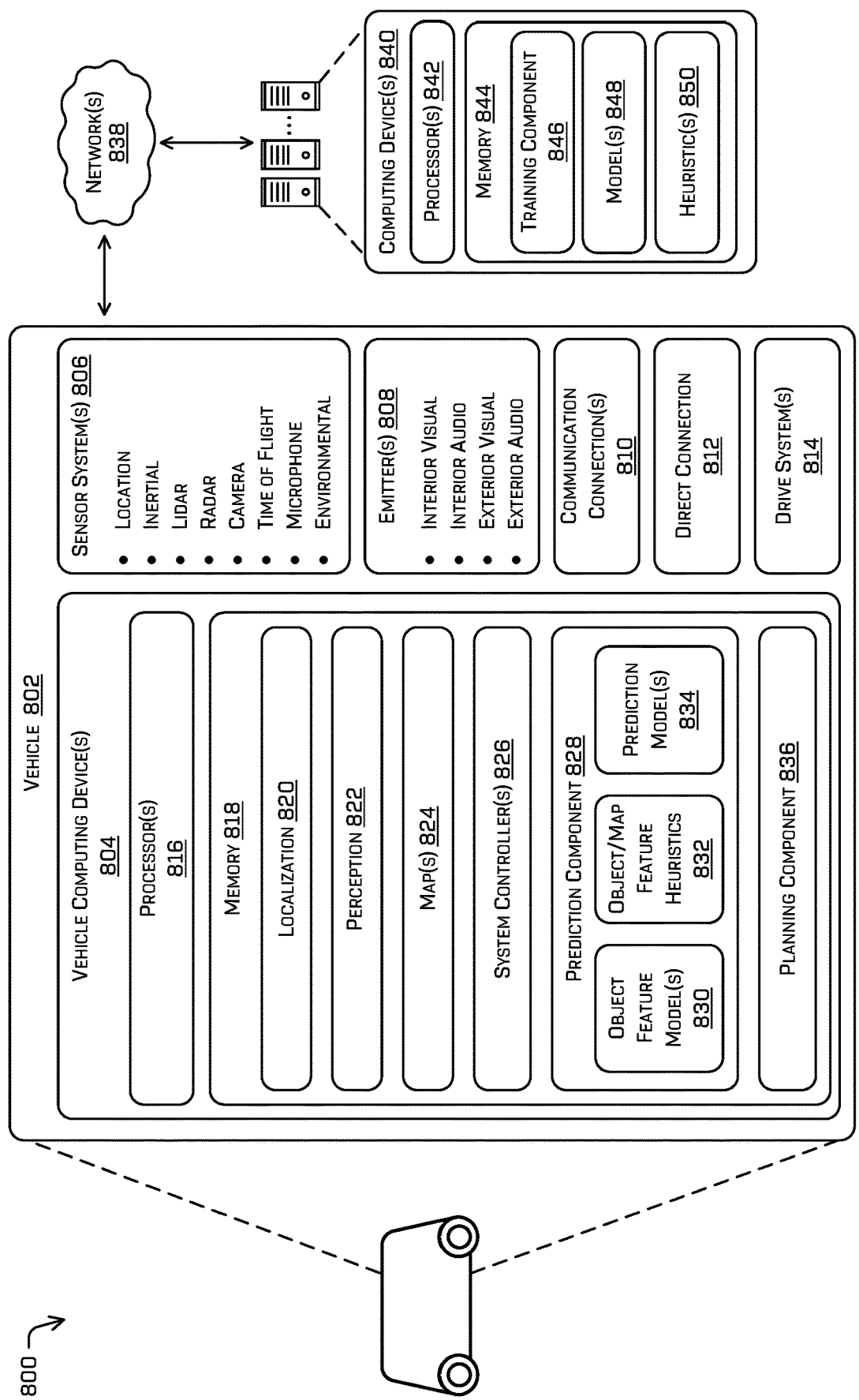
FIG. 8 depicts a block diagram of an example system for implementing various techniques described herein.

FIG. 8 depicts a block diagram of an example system 800 for implementing various techniques described herein. The system 800 can include a vehicle 802, which can correspond to vehicle 102 of FIG. 1, vehicle 606 of FIG. 6, and/or other any autonomous or semi-autonomous vehicle described herein. The vehicle 802 configured to perform various techniques and examples of modifying map data based on perceived objects and features in an environment, and using the modified map data to predicting future states for dynamic objects in the environment. In this example, the vehicle 802 may perceive any number of objects, object features, and/or additional environment-related features in a driving environment, and may use heuristics to determine one or more map data modifications based on the combination of objects and features perceived in the environment. Using the modified map data, the vehicle 802 may generate a multi-channel representation of the environment, use ML prediction models to determine predicted future state data for the dynamic objects in the environment, and use the predicted future state data to determine driving trajectories and/or maneuvers for the vehicle 802 to traverse the environment safely and efficiently.

The vehicle 802 in this example may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 802 can be configured to control all functions from start to completion of the trip, including all navigation and parking functions, it may or may not include a driver and/or controls for driving the vehicle 802, such as a steering wheel, an acceleration pedal, and/or a brake pedal. In the illustrated example, the vehicle 802 is an autonomous vehicle; however, the vehicle 802 could be any other type of vehicle or robotic platform. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 802 can include vehicle computing device(s) 804, one or more sensor systems 806, one or more emitters 808, one or more communication connections 810, at least one direct connection 812, and one or more drive systems 814. The vehicle computing device(s) 804 also can include one or more processors 816 and memory 818 communicatively coupled with the one or more processors 816. In the illustrated example, the memory 818 of the vehicle computing device(s) 804 stores a localization component 820, a perception component 822, one or more maps 824, one or more system controllers 826, a prediction component 828 comprising object feature models 830, object/map feature heuristics 832, prediction model(s) 834, and a planning component 836. Though depicted in FIG. 8 as residing in the memory 818 for illustrative purposes, it is contemplated that the localization component 820, a perception component 822, one or more maps 824, one or more system controllers 826, a prediction component 828, object feature models 830, object/map feature heuristics 832, prediction models 834, and a planning component 836 can additionally, or alternatively, be accessible to the vehicle 802 (e.g., stored on, or otherwise accessible by, memory remote from the vehicle 802).

In at least one example, the localization component 820 can include functionality to receive data from the sensor system(s) 806 to determine a position and/or orientation of the vehicle 802 (e.g., one or more of an x-, y-, z-position, roll, pitch, or yaw). For example, the localization component 820 can include and/or request/receive a map of an environment and can continuously determine a location and/or orientation of the autonomous vehicle within the map. In some instances, the localization component 820 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 820 can provide data to various components of the vehicle 802 to determine an initial position of an autonomous vehicle for generating a trajectory and/or for determining that an object is proximate to one or more crosswalk regions and/or for identifying candidate reference lines, as discussed herein.

In some instances, and in general, the perception component 822 can include functionality to perform object detection, segmentation, and/or classification. In some examples, the perception component 822 can provide processed sensor data that indicates a presence of an entity that is proximate to the vehicle 802 and/or a classification of the entity as an entity type (e.g., car, pedestrian, cyclist, animal, building, tree, road surface, curb, sidewalk, stoplight, stop sign, unknown, etc.). In additional or alternative examples, the perception component 822 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The memory 818 can further include one or more maps 824 that can be used by the vehicle 802 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 824 can include at least one map (e.g., images and/or a mesh).

In some examples, the vehicle 802 can be controlled based at least in part on the maps 824. That is, the maps 824 can be used in connection with the localization component 820, the perception component 822, the prediction component 828, and/or the planning component 836 to determine a location of the vehicle 802, identify objects in an environment, and/or generate routes and/or trajectories to navigate within an environment.

In some examples, the one or more maps 824 can be stored on a remote computing device(s) (such as the computing device(s) 840) accessible via network(s) 838. In some examples, multiple maps 824 can be stored based on, for example, a characteristic (e.g., type of entity, time of day, day of week, season of the year, etc.). Storing multiple maps 824 can have similar memory requirements, but can increase the speed at which data in a map can be accessed.

In at least one example, the vehicle computing device(s) 804 can include one or more system controllers 826, which can be configured to control steering, propulsion, braking, safety, emitters, communication, and other systems of the vehicle 802. These system controller(s) 826 can communicate with and/or control corresponding systems of the drive system(s) 814 and/or other components of the vehicle 802.

In general, the prediction component 828 can include functionality to generate predicted information associated with objects in an environment. The prediction component 828 may correspond to, for example, the prediction component 104 in FIG. 1. As discussed above, in some examples the prediction component 828 may include subcomponents implemented to determine object features associated with perceived objects and/or other environment-related features, use heuristics to determine map data modifications based on the objects and features, and use trained ML models to determine predicted future states for dynamic objects based on the modified map data and object data. In some examples, the techniques discussed herein can be implemented to predict future locations, poses, and/or trajectories of an object (e.g., a pedestrian, a vehicle, and the like) at various points in time as the vehicle 802 traverses an environment.

The object feature model(s) 830 can include functionality to detect specific features associated with objects in an environment. As described above, the object feature model(s) 830 can include CNNs and/or ML models trained to detect and classify various objects, object types, attributes, and/or object features described herein. Additional object feature model(s) 830 may be trained to determine environment-related features and/or any other feature or attribute associated with an object in the environment or the environment itself. Object features include, for example, any perceived items being carried by a pedestrian, wheeled vehicles controlled by a pedestrian, animals or children associated with a pedestrian, uniforms or other attire being worn by the pedestrian, a particular type or usage for a vehicle, a feature indicating whether or not the vehicle is currently parked and/or disabled, a road surface feature, building feature, etc. The object feature model(s) 830 can include individual CNNs or other ML models trained to detect such features based on image data and/or other sensor data. Although the object feature model(s) 830 in this example are shown within the prediction component 828, in other examples the object feature model(s) 830 may be implemented as part of the perception component 822 and/or within any other component of the vehicle 802.

The object/map feature heuristics 832, as described above, may include data defining relationships (e.g., associations) between combinations of objects/features and corresponding modifications to the map data. For instance, the object/map feature heuristics 832 may be implemented as one or more association tables such as table 300 in FIG. 3. Additionally or alternatively, the object/map feature heuristics 832 may be implemented as sets of rules, mappings, or other logic-based algorithms configured to determine specific map data modifications (e.g., map features to add or remove at particular map locations) based on combinations of objects and features perceived in the environment.

The prediction models 834 can include ML models trained to determine one or more predicted future states of a dynamic object in an environment, based at least in part on the modified map data, using the various techniques described herein. For example, for objects such as pedestrians, vehicles, bicycles, etc., the prediction models 834 may determine predicted locations, trajectories, and/or poses of the objects at one or more future timestamps. In some examples, the prediction models 834 may determine multiple alternative predicted future states, including confidence scores, probabilities, and/or likelihood that a dynamic object may have each of the alternative predicted states at a future time. As noted above, the prediction models 834 may include one or more machine learned models, implemented as artificial neural networks such as a fully connected neural networks, a convolutional neural networks, a recurrent neural network, and the like. In such examples, the prediction models 834 can be trained (e.g., by a training component 846 on a remote computing device) based on previous vehicle log data including map features and object associated with various objects and/or environments, to determine predicted future states for the dynamic objects. The training data can be input to machine learning models where a known result (e.g., a ground truth, such as the known "future" attributes) can be used to adjust weights and/or parameters of the machine learning model to minimize errors.

In general, the planning component 836 can determine a path for the vehicle 802 to follow to traverse the environment. For example, the planning component 836 can determine various routes, trajectories, and driving maneuvers at various levels of detail. For example, the planning component 836 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 836 can generate an instruction for guiding the autonomous vehicle along at least a portion of the route from the first location to the second location. In at least one example, the planning component 836 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 802 to navigate.

In some instances, the planning component 836 can generate one or more trajectories for the vehicle 802 based at least in part on predicted trajectories and/or location(s) associated with object(s) in an environment. In some examples, the planning component 836 can use temporal logic, such as linear temporal logic and/or signal temporal logic, to evaluate one or more trajectories of the vehicle 802.

As can be understood, the components discussed herein (e.g., the localization component 820, the perception component 822, the one or more maps 824, the one or more system controllers 826, the prediction component 828, the object feature model(s) 830, the object/map feature heuristics 832, the prediction model(s) 834, and the planning component 836) are described as divided for illustrative purposes. However, the operations performed by the various components can be combined or performed in any other component. Further, any of the components discussed as being implemented in software can be implemented in hardware, and vice versa. Further, any functionality implemented in the vehicle 802 can be implemented in the computing device(s) 840, or another component (and vice versa).

In at least one example, the sensor system(s) 806 can include time of flight sensors, lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 806 can include multiple instances of each of these or other types of sensors. For instance, the time of flight sensors can include individual time of flight sensors located at the corners, front, back, sides, and/or top of the vehicle 802. As another example, the camera sensors can include multiple cameras disposed at various locations about the exterior and/or interior of the vehicle 802. The sensor system(s) 806 can provide input to the vehicle computing device(s) 804. Additionally or alternatively, the sensor system(s) 806 can send sensor data, via the one or more networks 838, to the one or more computing device(s) 840 at a particular frequency, after a lapse of a predetermined period of time, in near real-time, etc.

The vehicle 802 can also include one or more emitters 808 for emitting light and/or sound, as described above. The emitters 808 in this example include interior audio and visual emitters to communicate with passengers of the vehicle 802. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 808 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 802 can also include one or more communication connection(s) 810 that enable communication between the vehicle 802 and one or more other local or remote computing device(s). For instance, the communication connection(s) 810 can facilitate communication with other local computing device(s) on the vehicle 802 and/or the drive system(s) 814. Also, the communication connection(s) 810 can allow the vehicle to communicate with other nearby computing device(s) (e.g., other nearby vehicles, traffic signals, etc.). The communications connection(s) 810 also enable the vehicle 802 to communicate with a remote teleoperations computing device or other remote services.

The communications connection(s) 810 can include physical and/or logical interfaces for connecting the vehicle computing device(s) 804 to another computing device or a network, such as network(s) 838. For example, the communications connection(s) 810 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 802 can include one or more drive systems 814. In some examples, the vehicle 802 can have a single drive system 814. In at least one example, if the vehicle 802 has multiple drive systems 814, individual drive systems 814 can be positioned on opposite ends of the vehicle 802 (e.g., the front and the rear, etc.). In at least one example, the drive system(s) 814 can include one or more sensor systems to detect conditions of the drive system(s) 814 and/or the surroundings of the vehicle 802. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 814. In some cases, the sensor system(s) on the drive system(s) 814 can overlap or supplement corresponding systems of the vehicle 802 (e.g., sensor system(s) 806).

The drive system(s) 814 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 814 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 814. Furthermore, the drive system(s) 814 also include one or more communication connection(s) that enable communication by the respective drive system with one or more other local or remote computing device(s).

In at least one example, the direct connection 812 can provide a physical interface to couple the one or more drive system(s) 814 with the body of the vehicle 802. For example, the direct connection 812 can allow the transfer of energy, fluids, air, data, etc. between the drive system(s) 814 and the vehicle. In some instances, the direct connection 812 can further releasably secure the drive system(s) 814 to the body of the vehicle 802.

In at least one example, the localization component 820, the perception component 822, the one or more maps 824, the one or more system controllers 826, the prediction component 828, the object feature model(s) 830, the object/map feature heuristics 832, the prediction model(s) 834, and the planning component 836 can process sensor data, as described above, and can send their respective outputs, over the one or more network(s) 838, to one or more computing device(s) 840. In at least one example, the localization component 820, the one or more maps 824, the one or more system controllers 826, the prediction component 828, the object feature model(s) 830, the object/map feature heuristics 832, the prediction model(s) 834, and the planning component 836 can send their respective outputs to the one or more computing device(s) 840 at a particular frequency, after a lapse of a predetermined period of time, in near real-time, etc.

In some examples, the vehicle 802 can send sensor data to one or more computing device(s) 840 via the network(s) 838. In some examples, the vehicle 802 can send raw sensor data to the computing device(s) 840. In other examples, the vehicle 802 can send processed sensor data and/or representations of sensor data to the computing device(s) 840. In some examples, the vehicle 802 can send sensor data to the computing device(s) 840 at a particular frequency, after a lapse of a predetermined period of time, in near real-time, etc. In some cases, the vehicle 802 can send sensor data (raw or processed) to the computing device(s) 840 as one or more log files.

The computing device(s) 840 can include processor(s) 842 and a memory 844 storing a training component 846.

In some instances, the training component 846 can include functionality to train one or more models, including but not limited to models to determine the presence of objects and features (e.g., object feature models 830) and/or prediction models 834 to predict the future states of dynamic objects, as discussed herein. In some instances, the training component 846 can communicate information generated by the one or more models to the vehicle computing device(s) 804 to revise how to control the vehicle 802 in response to different situations.

For example, the training component 846 can train one or more machine learning models 848, which may include similar or identical models to the object feature models 830 and/or prediction model(s) 834 discussed herein. In some examples, the training component 846 can include one or more sets of heuristics data 850, which may be similar or identical to the various object/map feature heuristics 832 provided various different vehicles. In some cases, different models and/or different heuristics may be trained and provided to different vehicles depending on the specification of the vehicles (e.g., vehicle hardware and capabilities, software versions, etc.).

For instance, aspects of some or all of the components discussed herein can include any models, algorithms, and/or machine learned algorithms. For example, in some instances, the components in the memory 844 (and the memory 818, discussed above) can be implemented as a neural network. In some examples, the training component 846 can utilize a neural network to generate and/or execute one or more models, as discussed herein.

Although discussed in the context of neural networks, any type of machine learning can be used consistent with this disclosure. For example, machine learning or machine learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The processor(s) 816 of the vehicle 802 and the processor(s) 842 of the computing device(s) 840 can be any suitable processor capable of executing instructions to process data and perform operations as described herein. By way of example and not limitation, the processor(s) 816 and 842 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 818 and 844 are examples of non-transitory computer-readable media. The memory 818 and 844 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 8 is illustrated as a distributed system, in alternative examples, components of the vehicle 802 can be associated with the computing device(s) 840 and/or components of the computing device(s) 840 can be associated with the vehicle 802. That is, the vehicle 802 can perform one or more of the functions associated with the computing device(s) 840, and vice versa. Further, aspects of the prediction component 828 (and subcomponents) can be performed on any of the devices discussed herein.

Figure 9:
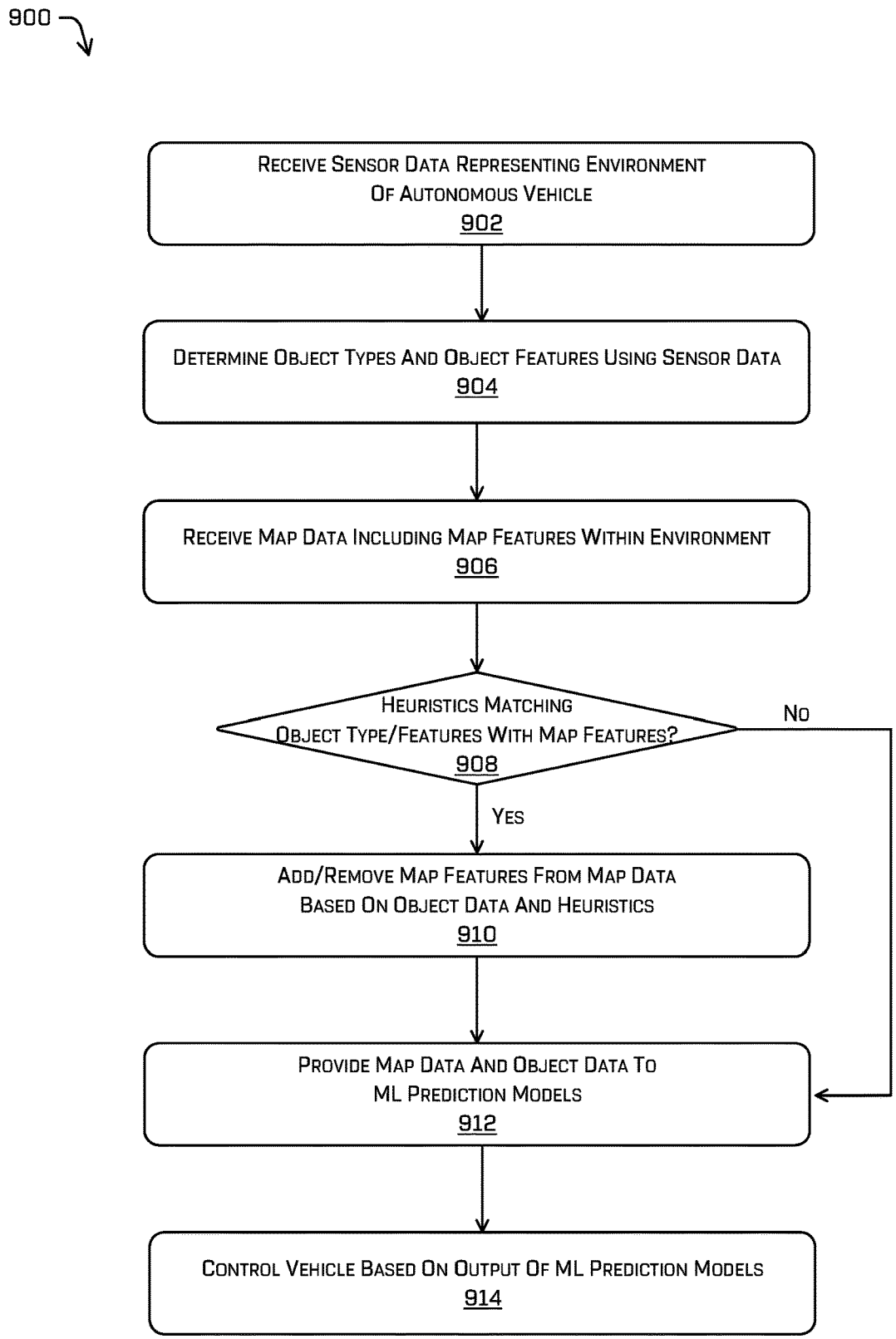
FIG. 9 is a flow diagram illustrating an example process of modifying the map data on a vehicle based on object features determined from sensor data, and using the modified map data in ML prediction models to predict the future states of dynamic objects, in accordance with one or more examples of the disclosure.

FIG. 9 is a flow diagram illustrating an example process 900 of modifying the map data based on object features perceived in an environment, and using the modified map data in ML prediction models to predict the future states of dynamic objects in the environment. As described below, the operations in process 900 may be performed by a vehicle 102 (e.g., autonomous vehicle) including a prediction component 104 and/or other vehicle components configured to execute the functionality of the object feature models 830, object/map feature heuristics 832, prediction model(s) 834 as described herein.

Process 900 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 902, the vehicle 102 may capture (or otherwise receive) sensor data of an environment. In this example, the sensor data may include data depicting various static and/or dynamic objects. The sensor data may include image data depicting a driving scene, and/or may include various other sensor data types instead of or in addition to image data (e.g., lidar point clouds, radar data, audio data, etc.).

At operation 904, the vehicle 102 may detect (or perceive) one or more objects in the environment based on the sensor data, including determining the object types and/or object features of one or more objects in the environment. In some examples, a perception component of the vehicle 102 may use a number of trained ML models (e.g., implemented as CNNs) to detect and classify particular object types and/or object features (or particular combinations thereof). For instance, object feature model(s) 830 may use the sensor data captured in operation 902 as input, and may output detected objects, object types, object features, object locations, and/or other object attributes. As described above, specialized object feature models 830 may be trained to identify specific object features (e.g., handheld signs, pedestrian hand signals, hinged stop signs on bus schools, different uniform types, different construction equipment types, different construction road signs/markers, etc.), based on the size, shape, color, and/or movement patterns associated with the objects and/or other associated objects.

At operation 906, the vehicle 102 may receive map data associated with the environment, including predefined map features representing the static scene context of the environment. The map data received in operation 906 may include a number of map features representing fixed and/or static features within the environment. For instance, various map features representing fixed elements in the environment may include, but are not limited to, map features corresponding to roads, lanes, curbs, shoulders, crosswalks, buildings, trees, medians, street signs, traffic signals, speed limits, school zones, loading zones, etc. In some examples, the map data may be based on the maps provided to the vehicle 102 and used by the vehicle to navigate within the environment. Additionally or alternatively, the vehicle 102 may generate the map data based on a combination of sensor data and preexisting maps received from remote (e.g., off-vehicle) map data sources. For example, the sensor data captured by the vehicle sensors and the maps received remote map data sources may be processed to determine a feature map representing the current region in the environment.

At operation 908, the vehicle 102 may apply a set of heuristics to the objects/features perceived in operation 906, to determine whether or not any combinations of the current objects/features match the heuristic conditions for modifying the map data. As discussed above, the heuristics used by the prediction component 104 (e.g., object/map feature heuristics 832) may be implemented as one or more tables, rules, algorithms, or the like. The heuristics may define a set of relationships (or associations) between combinations of objects/features and corresponding modifications to the map data. For instance, when a specified combination of objects/features is perceived by the vehicle 102, the heuristics data may define the particular modification(s) of the map data to be performed.

If the perceived object data corresponds to one or more associated map data modifications defined in the heuristics (908: Yes), then in operation 910 the prediction component 104 may perform the particular map data modification indicated by the heuristics. The particular map data modification may include adding, removing, and/or modifying one or more map features of specified map feature types and at specified map locations. As a simple example, based on the heuristics data, the prediction component 104 may add a new stop sign map feature to the map data in response to detecting a construction worker with a handheld stop sign (and/or other related objects/features). In various other examples, any number of new map features may be added or modified (e.g., relocated), and/or any number of existing map features may be removed from the map data. In contrast, if the prediction component does not identify any object/features corresponding to map data modifications in the heuristics data (908: No), then process 900 proceeds to operation 912.

At operation 912, the map data (which may or may not have been modified in operation 910) is provided to one or more ML prediction models configured to output predicted future states of the dynamic objects in the environment. As described above, in some cases the prediction component 104 may be configured to generate a multi-channel representation of the environment, by incorporating (e.g., overlaying or merging) the map data representing the static scene context, with the object data perceived by the vehicle 102. Such multi-channel representations may include, for instance, top-down image-based representations and/or graph-based representations stored as GNNs. A multi-channel representation of the environment may be provided as input to one or more prediction models 834 configured to output predicted future state data (e.g., future locations, trajectories, poses, etc.) for one or more pedestrians, vehicles, or other dynamic objects in the environment. Finally, at operation 914, the vehicle 102 may be controlled based on the output of the ML prediction models used in operation 912. For instance, a planning component of the vehicle 102 may use the predicted trajectories of the dynamic objects in the environment, and/or other predicted state data for one or more future timestamps, to determine and execute driving maneuvers for the vehicle 102 safely and efficiently navigate the environment.

Example Clauses

A. A method comprising: receiving sensor data associated with an environment; determining, based at least in part on a first subset of the sensor data, a first object at a first physical location in the environment, and a first object type associated with the first object; determining, based at least in part on a second subset of the sensor data, a second object at a second physical location in the environment, wherein the second object is a dynamic object; receiving map data associated with the environment; determining a map feature type associated with the first object, wherein the map feature type is based at least in part on a traffic control directive associated with the first object, and wherein the map feature type represents an object type different from the first object type; generating modified map data, including combining a new map feature of the map feature type with the map data, at a first map location associated with the first physical location; determining a representation of the environment, based at least in part on the second subset of the sensor data and the modified map data; providing the representation as input to a machine learning model; determining a predicted trajectory of the second object, based at least in part on an output of the machine learning model; and controlling an autonomous vehicle in the environment, based at least in part on the predicted trajectory of the second object.

B. The method of paragraph A, wherein generating the modified map data further comprises: determining an existing map feature within the map data, based at least in part on a distance between the first map location and a second map location associated with the existing map feature, wherein the existing map feature is associated with a second traffic control directive; and removing the existing map feature from the map data.

C. The method of paragraph A, wherein generating the modified map data comprises: determining, based at least in part on the first object type and the first physical location, a second new map feature and a third physical location in the environment, wherein the third physical location is different from the first physical location; and adding the second new map feature into the map data, at a second map location corresponding to the third physical location.

D. The method of paragraph A, wherein determining the map feature type associated with the first object comprises: providing, based at least in part on the first object type, image data associated with the first object to a second machine learning model; determining a visual feature associated with the first object, based at least in part on an output of the second machine learning model; and determining the map feature type based at least in part on the visual feature associated with the first object.

E. The method of paragraph D, further comprising: receiving updated sensor data associated with the environment; providing updated image data associated with the first object to the second machine learning model; determining a second visual feature associated with the first object, based at least in part on a second output of the machine learning model; and generating second modified map data, wherein the second modified map data excludes the new map feature.

F. One or more non-transitory computer-readable media storing instructions executable by a processor, wherein the instructions, when executed, cause the processor to perform operations comprising: receiving sensor data from a sensor associated with a vehicle operating in an environment; receiving map data associated with the environment; determining, based at least in part on the sensor data, an object at a physical location in the environment, wherein the object is associated with a traffic control directive; determining a map feature type associated with the object based, at least in part, on the traffic control directive; generating modified map data, including combining a new map feature of the map feature type with the map data, at a map location associated with the physical location such that the new map feature is associated with the traffic control directive; and controlling the vehicle in the environment, based at least in part on the modified map data.

G. The one or more non-transitory computer-readable media of paragraph F, wherein controlling the vehicle comprises: providing, to a machine learning model, the modified map data and object data associated with a dynamic object in the environment; and determining a predicted trajectory of the dynamic object, based at least in part on an output of the machine learning model.

H. The one or more non-transitory computer-readable media of paragraph F, wherein generating the modified map data further comprises: determining an existing map feature within the map data, based at least in part on a distance between the map location and a second map location associated with the existing map feature, wherein the existing map feature is associated with a second traffic control directive; and removing the existing map feature from the map data.

I. The one or more non-transitory computer-readable media of paragraph F, wherein the object is a construction worker or police officer and wherein the new map feature type includes at least one of a stop sign map feature type or a traffic signal map feature type.

J. The one or more non-transitory computer-readable media of paragraph F, wherein generating the modified map data comprises: determining, based at least in part on the traffic control directive and the physical location, a second new map feature and a second physical location in the environment, wherein the physical location is different from the second physical location; and combining the second new map feature with the map data, at a second map location corresponding to the second physical location.

K. The one or more non-transitory computer-readable media of paragraph F, wherein determining the map feature type associated with the object comprises: providing image data associated with the object to a machine learning model; determining a visual feature associated with the object, based at least in part on an output of the machine learning model; and determining the map feature type based at least in part on the visual feature associated with the object.

L. The one or more non-transitory computer-readable media of paragraph K, the operations further comprising: receiving updated sensor data associated with the environment; providing updated image data associated with the object to the machine learning model; determining a second visual feature associated with the object, based at least in part on a second output of the machine learning model; and generating second modified map data, wherein the second modified map data excludes the new map feature.

M. The one or more non-transitory computer-readable media of paragraph F, further comprising: determining a second object in the environment, based at least in part on a subset of the sensor data; determining a multi-channel representation of the environment, based at least in part on the subset of the sensor data and the modified map data, wherein the multi-channel representation includes at least one of a top-down representation or a graph-based representation; and providing the multi-channel representation as input to a machine learning model configured to output a predicted trajectory of the second object.

N. An autonomous vehicle comprising: a sensor; one or more processors; and one or more computer-readable media storing instructions that, when executed by the one or more processors, cause the autonomous vehicle to perform operations comprising: receiving sensor data from a sensor associated with a vehicle operating in an environment; receiving map data associated with the environment; determining, based at least in part on the sensor data, an object at a physical location in the environment, wherein the object is associated with a traffic control directive; determining a map feature type associated with the object based, at least in part, on the traffic control directive; generating modified map data, including combining a new map feature of the map feature type with the map data, at a map location associated with the physical location such that the new map feature is associated with the traffic control directive; and controlling the vehicle in the environment, based at least in part on the modified map data.

O. The autonomous vehicle of paragraph N, wherein controlling the autonomous vehicle comprises: providing, to a machine learning model, the modified map data and object data associated with a dynamic object in the environment; and determining a predicted trajectory of the dynamic object, based at least in part on an output of the machine learning model.

P. The autonomous vehicle of paragraph N, wherein generating the modified map data further comprises: determining an existing map feature within the map data, based at least in part on a distance between the map location and a second map location associated with the existing map feature, wherein the existing map feature is associated with a second traffic control directive; and removing the existing map feature from the map data.

Q. The autonomous vehicle of paragraph N, wherein the object is a construction worker or police officer and wherein the map feature type includes at least one of a stop sign map feature type or a traffic signal map feature type.

R. The autonomous vehicle of paragraph N, wherein generating the modified map data comprises: determining, based at least in part on the traffic control directive and the physical location, a second new map feature and a second physical location in the environment, wherein the physical location is different from the second physical location; and combining the second new map feature with the map data, at a second map location corresponding to the second physical location.

S. The autonomous vehicle of paragraph N, wherein determining the map feature type associated with the object comprises: providing image data associated with the object to a machine learning model; determining a visual feature associated with the object, based at least in part on an output of the machine learning model; and determining the map feature type based at least in part on the visual feature associated with the object.

T. The autonomous vehicle of paragraph S, the operations further comprising: receiving updated sensor data associated with the environment; providing updated image data associated with the object to the machine learning model; determining a second visual feature associated with the object, based at least in part on a second output of the machine learning model; and generating second modified map data, wherein the second modified map data excludes the new map feature.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
receiving sensor data associated with an environment;
determining, based at least in part on a first subset of the sensor data, a first object at a first physical location in the environment, and a first object type associated with the first object;
determining, based at least in part on a second subset of the sensor data, a second object at a second physical location in the environment, wherein the second object is a dynamic object;
receiving map data associated with the environment;
determining a map feature type associated with the first object, wherein the map feature type is based at least in part on a traffic control directive associated with the first object, and wherein the map feature type represents an object type different from the first object type;

generating modified map data, including combining a new map feature of the map feature type with the map data, at a first map location associated with the first physical location;
determining a representation of the environment, based at least in part on the second subset of the sensor data and the modified map data;
providing the representation as input to a machine learning model;
determining a predicted trajectory of the second object, based at least in part on an output of the machine learning model; and
controlling an autonomous vehicle in the environment, based at least in part on the predicted trajectory of the second object.

2. The method of claim 1, wherein generating the modified map data further comprises:
determining an existing map feature within the map data, based at least in part on a distance between the first map location and a second map location associated with the existing map feature, wherein the existing map feature is associated with a second traffic control directive; and
removing the existing map feature from the map data.

3. The method of claim 1, wherein generating the modified map data comprises:
determining, based at least in part on the first object type and the first physical location, a second new map feature and a third physical location in the environment, wherein the third physical location is different from the first physical location; and
adding the second new map feature into the map data, at a second map location corresponding to the third physical location.

4. The method of claim 1, wherein determining the map feature type associated with the first object comprises:
providing, based at least in part on the first object type, image data associated with the first object to a second machine learning model;
determining a visual feature associated with the first object, based at least in part on an output of the second machine learning model; and
determining the map feature type based at least in part on the visual feature associated with the first object.

5. The method of claim 4, further comprising:
receiving updated sensor data associated with the environment;
providing updated image data associated with the first object to the second machine learning model;
determining a second visual feature associated with the first object, based at least in part on a second output of the machine learning model; and
generating second modified map data, wherein the second modified map data excludes the new map feature.

6. One or more non-transitory computer-readable media storing instructions executable by a processor, wherein the instructions, when executed, cause the processor to perform operations comprising:
receiving sensor data from a sensor associated with a vehicle operating in an environment;
receiving map data associated with the environment;
determining, based at least in part on the sensor data, an object at a physical location in the environment, wherein the object is associated with a traffic control directive;
determining a map feature type associated with the object based, at least in part, on the traffic control directive;
generating modified map data, including combining a new map feature of the map feature type with the map data, at a map location associated with the physical location such that the new map feature is associated with the traffic control directive; and
controlling the vehicle in the environment, based at least in part on the modified map data.

7. The one or more non-transitory computer-readable media of claim 6, wherein controlling the vehicle comprises:
providing, to a machine learning model, the modified map data and object data associated with a dynamic object in the environment; and
determining a predicted trajectory of the dynamic object, based at least in part on an output of the machine learning model.

8. The one or more non-transitory computer-readable media of claim 6, wherein generating the modified map data further comprises:
determining an existing map feature within the map data, based at least in part on a distance between the map location and a second map location associated with the existing map feature, wherein the existing map feature is associated with a second traffic control directive; and
removing the existing map feature from the map data.

9. The one or more non-transitory computer-readable media of claim 6, wherein the object is a construction worker or police officer and wherein the new map feature type includes at least one of a stop sign map feature type or a traffic signal map feature type.

10. The one or more non-transitory computer-readable media of claim 6, wherein generating the modified map data comprises:
determining, based at least in part on the traffic control directive and the physical location, a second new map feature and a second physical location in the environment, wherein the physical location is different from the second physical location; and
combining the second new map feature with the map data, at a second map location corresponding to the second physical location.

11. The one or more non-transitory computer-readable media of claim 6, wherein determining the map feature type associated with the object comprises:
providing image data associated with the object to a machine learning model;
determining a visual feature associated with the object, based at least in part on an output of the machine learning model; and
determining the map feature type based at least in part on the visual feature associated with the object.

12. The one or more non-transitory computer-readable media of claim 11, the operations further comprising:
receiving updated sensor data associated with the environment;
providing updated image data associated with the object to the machine learning model;
determining a second visual feature associated with the object, based at least in part on a second output of the machine learning model; and
generating second modified map data, wherein the second modified map data excludes the new map feature.

13. The one or more non-transitory computer-readable media of claim 6, further comprising:
determining a second object in the environment, based at least in part on a subset of the sensor data;
determining a multi-channel representation of the environment, based at least in part on the subset of the sensor data and the modified map data, wherein the multi-channel representation includes at least one of a top-down representation or a graph-based representation; and providing the multi-channel representation as input to a machine learning model configured to output a predicted trajectory of the second object.

14. An autonomous vehicle comprising:

a sensor;

one or more processors; and one or more computer-readable media storing instructions that, when executed by the one or more processors, cause the autonomous vehicle to perform operations comprising:

receiving sensor data from a sensor associated with a vehicle operating in an environment;

receiving map data associated with the environment;

determining, based at least in part on the sensor data, an object at a physical location in the environment, wherein the object is associated with a traffic control directive;

determining a map feature type associated with the object based, at least in part, on the traffic control directive;

generating modified map data, including combining a new map feature of the map feature type with the map data, at a map location associated with the physical location such that the new map feature is associated with the traffic control directive; and controlling the vehicle in the environment, based at least in part on the modified map data.

15. The autonomous vehicle of claim 14, wherein controlling the autonomous vehicle comprises:

providing, to a machine learning model, the modified map data and object data associated with a dynamic object in the environment; and determining a predicted trajectory of the dynamic object, based at least in part on an output of the machine learning model.

16. The autonomous vehicle of claim 14, wherein generating the modified map data further comprises:

determining an existing map feature within the map data, based at least in part on a distance between the map location and a second map location associated with the existing map feature, wherein the existing map feature is associated with a second traffic control directive; and removing the existing map feature from the map data.

17. The autonomous vehicle of claim 14, wherein the object is a construction worker or police officer and wherein the map feature type includes at least one of a stop sign map feature type or a traffic signal map feature type.

18. The autonomous vehicle of claim 14, wherein generating the modified map data comprises:

determining, based at least in part on the traffic control directive and the physical location, a second new map feature and a second physical location in the environment, wherein the physical location is different from the second physical location; and combining the second new map feature with the map data, at a second map location corresponding to the second physical location.

19. The autonomous vehicle of claim 14, wherein determining the map feature type associated with the object comprises:

providing image data associated with the object to a machine learning model;

determining a visual feature associated with the object, based at least in part on an output of the machine learning model; and determining the map feature type based at least in part on the visual feature associated with the object.

20. The autonomous vehicle of claim 19, the operations further comprising:

receiving updated sensor data associated with the environment;

providing updated image data associated with the object to the machine learning model;

determining a second visual feature associated with the object, based at least in part on a second output of the machine learning model; and generating second modified map data, wherein the second modified map data excludes the new map feature.

* * * * *